(12) United States Patent
Hu et al.

(10) Patent No.: US 12,486,193 B2
(45) Date of Patent: Dec. 2, 2025

(54) COATED MICROCRYSTALLINE GLASS WITH IMPROVED WATER-REPELLENT AND OIL-REPELLENT PROPERTY, PREPARATION METHOD AND APPLICATION THEREOF

(71) Applicant: CHONGQING AUREAVIA HI-TECH GLASS CO., LTD, Chongqing (CN)

(72) Inventors: Wei Hu, Chongqing (CN); Qifang Zheng, Chongqing (CN); Hao Huang, Chongqing (CN); Shuang Deng, Chongqing (CN); Baoquan Tan, Chongqing (CN); Hong Jiang, Chongqing (CN)

(73) Assignee: Chongqing Aureavia Hi-Tech Glass Co., Ltd, Chongqing (CN)

( * ) Notice: Subject to any disclaimer, the term of this patent is extended or adjusted under 35 U.S.C. 154(b) by 984 days.

(21) Appl. No.: 17/583,852

(22) Filed: Jan. 25, 2022

(65) Prior Publication Data
US 2022/0242776 A1 Aug. 4, 2022

(30) Foreign Application Priority Data
Jan. 29, 2021 (CN) .......................... 202110128889.1

(51) Int. Cl.
*C03C 3/095* (2006.01)
*C03C 10/00* (2006.01)
(Continued)

(52) U.S. Cl.
CPC .............. *C03C 3/095* (2013.01); *C03C 17/23* (2013.01); *C03C 17/3452* (2013.01);
(Continued)

(58) Field of Classification Search
None
See application file for complete search history.

(56) References Cited

U.S. PATENT DOCUMENTS

2013/0271836 A1* 10/2013 Fukaya .................... G02B 1/18
359/507

FOREIGN PATENT DOCUMENTS

CN 103582617 A 2/2014
CN 106715352 A 5/2017
(Continued)

OTHER PUBLICATIONS

Chinese Patent Application No. 202110128889.1, English translation of Office Action dated Jul. 8, 2022, 9 pages.

*Primary Examiner* — David Sample
(74) *Attorney, Agent, or Firm* — COZEN O'CONNOR

(57) ABSTRACT

A microcrystalline glass containing a water-repellent and oil-repellent composite coating layer on the surface, a preparation method and application thereof. The coated glass is a microcrystalline glass or a glass ceramic containing a water-repellent and oil-repellent composite coating layer on the surface, which is characterized in that from the outmost surface of the glass, it includes: a water-repellent and oil-repellent layer, an intermediate layer, a bottom layer and a microcrystalline glass or a glass ceramic, wherein, the intermediate layer is the intermediate layer containing ionic crystals with a lattice energy of 700-3000 kJ/mol and formed by the same, the bottom layer includes compounds containing Si—O bonds or a mixed silicon oxide layer. The present invention can form a firm, durable and excellent water-repellent and oil-repellent coating film even if the coating interface of microcrystalline glass has very few Si—O structure, and can achieve excellent water-repellent and oil-repellent property regardless of whether the high-crystallinity glass has done ion exchange or not.

18 Claims, 1 Drawing Sheet

(51) Int. Cl.
*C03C 17/23* (2006.01)
*C03C 17/34* (2006.01)
(52) U.S. Cl.
CPC ...... *C03C 10/0027* (2013.01); *C03C 2217/76* (2013.01); *C03C 2217/92* (2013.01)

(56) References Cited

FOREIGN PATENT DOCUMENTS

| | | | | |
|---|---|---|---|---|
| CN | 109651941 A | * | 4/2019 | ........... C09D 171/00 |
| CN | 110436788 A | * | 11/2019 | |
| CN | 111087174 A | | 5/2020 | |

* cited by examiner

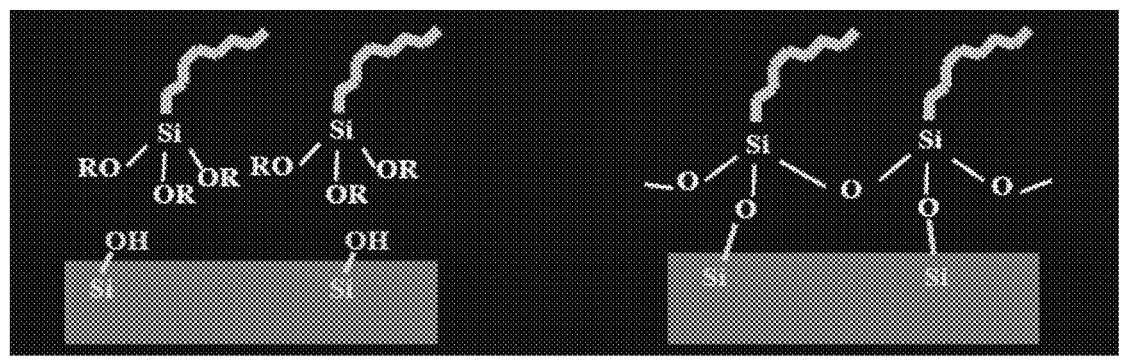

COATED MICROCRYSTALLINE GLASS WITH IMPROVED WATER-REPELLENT AND OIL-REPELLENT PROPERTY, PREPARATION METHOD AND APPLICATION THEREOF

TECHNICAL FIELD

The present invention relates to a coated glass with water-repellent and oil-repellent property, a preparation method and application thereof, and more particularly, to a microcrystalline glass with a high crystallinity and containing a water-repellent and oil-repellent composite coating layer on the surface of the microcrystalline glass.

BACKGROUND ART

Generally, glass has a high surface activity, so water-repellent and oil-repellent property of glass is generally not very good. In other words, it is easy for glass to adhere to dirty stuff, and it is difficult to clean off the dirty stuff from the surface of glass. In many application scenarios, for example: stove, lampblack machine glass products, mobile phones, tablet PC, touch screen man-machine interaction window and so on, people usually coat a layer of "water-repellent" film on the surface of glass to reduce the active energy on glass surface, in order to improve the capacity of "water-repellency and oil-repellency" and the hydrophobicity. After the hydrophobic capacity increases, the improvement of "sliding" can be felt when one's finger contacts the glass surface, this is also due to the increase in hydrophobicity and reduction in sliding friction coefficient, which is a feature that improves the user experience for the touch interface.

In prior art, in order to improve water-repellent and oil-repellent property of glass surface, the method of coating film directly on glass surface is normally used. The general coating material is PFPE (perfluoro poly ether, a kind of fluoro-containing polyether silicon oxide). The structure of the fluoro-containing polyether silicon oxide (e.g. alkoxy silicide) is shown in Formula (1) below:

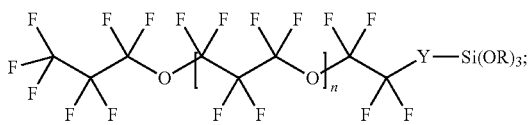

(1)

wherein R can be a carbon, a hydrogen or a silicon element; Y can be ether bond, sulfur-containing hydrocarbon group, sulfur-containing alkoxy group, nitro-containing hydrocarbon group, nitro-containing alkoxy group, epoxy alkyl group, acyloxy hydrocarbon group, hydrocarbon group, sulfur group, etc.

The connection process of PFPE and glass is a chemical reaction process, PFPE is hydrolyzed (PFPE-Si-OR+ $H_2O \rightarrow$ PFPE-Si-OH+ROH), then reacted by dehydration condensation (as shown in FIG. 1, PFPE-Si-OH+H—O—Si→$H_2O$+PFPE-Si—O—Si—), such that the PFPE film is connected with the glass by forming a valence bond with the Si—O structure on the glass interface, rather than relying on the physical phenomenon of van der Waals force connection between molecules like most vacuum coating films.

The coating method in prior art is usually described as follows. In view of the large amount of Si—O structure in the glass, PFPE is qualified to react with the glass directly to form a film, but the $SiO_2$ mass proportion in the glass is usually not more than 70%. In order to improve the coating effect and durability, the following two coating methods are generally used:

A) dry method: also known as vacuum coating method, in vacuum, a layer of $SiO_2$ coating is first coated on the glass surface to improve the Si—O ratio, and then a layer of PFPE is coated in the vacuum environment;

B) wet method: also known as spraying coating method, in the atmosphere, the glass surface is first bombarded by plasma, on the one hand, cleaning the glass surface, on the other hand, making the glass surface coarsely, to increase the glass surface area in the microscopic, indirectly improve the proportion of Si—O, and then sprayed with a layer of PFPE solution.

The existing patent CN208747932U discloses a structure of the antifouling coating layer on the surface of transparent microcrystalline glass, which is characterized in that the outer surface of the microcrystalline glass body (1) is attached with a colorless transparent antifouling layer (11) with a thickness of 4-30 nm, and the antifouling layer (11) is a fluorosilicon hydrolytic compound. The patent records that the microcrystalline glass device is characterized by silicon dioxide layer with a thickness of 3-20 nm under the antifouling layer (11).

However, the characteristic of the microcrystalline glass mainly protected by this patent is that "the mass ratio of the crystal phase and the glass phase in the microcrystalline glass body is 0.25-1.2", which belongs to the microcrystalline glass with a middle or lower crystallinity. The glass phase in the microcrystalline glass body is evenly wrapped around the crystal phase, and the glass phase has sodium, lithium, potassium and other alkali metal ions. And the value of alkali metal oxide in the glass phase divided by the mass of alumina plus the mass of silica is 6%-30%, and the crystallinity of the microcrystalline glass is 20-54.54%. The Si—O structure in the glass phase of the microcrystalline glass is still enough to support the formation of valence bond between PFPE and the microcrystalline glass. But for high crystallinity microcrystalline glass, the invention does not mention any related topic.

The existing patent CN106715352A, in view of the poor adhesion and durability existed in the amphiphobic or anti-fingerprint coating layer on the surface of prestressed glass produced by ion exchange: "from the foregoing, it can be appreciated that the durability of an amphiphobic or anti-fingerprint coating is clearly reduced by chemical pre-stressing. This is reflected, for example, in shorter durability in relevant tests, such as the neutral salt spray test which is described in detail for example in WO 2012/163946 and WO 2012/163947." The patent discloses the solution as follows: what is needed in the art is a glass substrate which overcomes some of the disadvantages previously described and that is chemically prestressed and has an amphiphobic coating that possesses sufficient long-term durability. Moreover, a method to produce such a coated and chemically prestressed glass substrate is needed. The present invention provides a glass substrate which solves some of the previously described problems in a surprising manner, wherein chemical pre-stressing of the glass substrate in the form of an ion exchange is conducted through all layers that are disposed on the glass and the functionality-coating that is present on the glass substrate is then activated, after which the amphiphobic coating that acts as an anti-fingerprint coating is applied. That is to say, the glass without ion exchange is first subjected to "functional coating", then "ion exchanged", followed by "activation functional coating", and then "amphiphobic coating film". Among other things, the patent states that it has proven to be useful if the functional layer, in particular the uppermost functional layer, includes or consists of one or more Si-compounds, such as one or more silicon oxide compounds. The Si-compound can be selected, for example, from a silicon oxide. The silicon oxide can be $SiO_x$ with x being less or equal 2, SiOC, SiON, SiOCN and $Si_3N_4$, as well as hydrogen that can be combined in any volume with $SiO_x$, with x being less or equal 2, SiOC, SiON and SiOCN. In one exemplary example, the functional layer, such as the uppermost functional layer, is a silicon mixed oxide layer. Therefore, the patent discloses that the "functional coating" is composed mainly of inorganic materials containing Si—O structure. The patent states that "the long-term stability of an amphiphobic coating is regularly being degraded through chemical prestressing. According to the present invention, this disadvantage can be removed. According to the present invention, the at least one functional layer is activated after chemical prestressing, so that the surface of the functional layer interacts with an amphiphobic coating that is to be applied"; furthermore, the patent states that through enrichment of alkali ions in the surface of the uppermost functional layer, the number of active bonding sites, for example Si—OH in a Si-containing functional layer, are reduced, thus inhibiting covalent bonding to the amphiphobic coating so that the amphiphobic coating has poorer adhesion and lower long-term stability. The surface of the uppermost functional layer is, in addition, generally burdened with inorganic and organic contamination, which can counter the desired interaction. Therefore, such patent adjusts the order of ion exchange and uses surface activation to activate Si—O to increase the combination ability of the amphiphobic coating. In other words, the patent is completely a technical optimization for the glass rich in Si—O structure and the functional substrate rich in Si—O structure.

SUMMARY OF THE INVENTION

The invention is aimed at the principle of glass coating, which is based on a water-repellent oil-repellent coating film with inorganic glass as the substrate, generally the following water-repellent oil-repellent effect can be achieved: the initial water drop contact angle tested is more than 110°, to about 115°, the water drop contact angle can still reach more than 100° after 5000 times of friction. However, for microcrystalline glass with a high crystallinity greater than 60%, the effect is very poor if it is made according to the principle and practice of existing technology (surface activation is used to activate Si—O to increase the combination ability of the amphiphobic coating layer). The initial water drop contact angle can only reach about 100°, and the water drop contact angle only reaches about 60° after 2500 times of friction. Microcrystalline glass is also a kind of glass, the content of Si—O in its composition is not less than ordinary inorganic glass, but why there is such a big difference? It can be understood that traditional approaches of water-repellent and oil-repellent coating layer are solutions made for Si—O rich interface structure, which do not work effectively at a glass with a high crystallinity, or in the absence of glass phases or Si—O structures at the interface.

In order to solve the existing technical problems mentioned above, the invention provides the following technical solutions:

A microcrystalline glass containing a water-repellent and oil-repellent composite coating layer on the surface, characterized in that from the outermost surface of the microcrystalline glass, it includes: a water-repellent and oil-repellent layer, an intermediate layer and a bottom layer, wherein, the intermediate layer is the intermediate layer containing ionic crystals with a lattice energy of 700-3000 kJ/mol, the bottom layer includes compounds containing Si—O bonds or a mixed silicon oxide layer.

Preferably, as for the microcrystalline glass according to any one of the above mentioned, its crystallinity may be greater than 60%; or greater than 70%; or greater than 80%.

Preferably, as for the microcrystalline glass according to any one of the above mentioned, the intermediate layer is an intermediate layer formed by the ionic crystal with a lattice energy of 725-3000 kJ/mol, and preferably 770-3000 kJ/mol as the original coating material;

or a fluoride intermediate layer formed by a compound with a lattice energy of 9400-11400 kJ/mol, preferably a fluorosilicide, as the original coating material.

Preferably, as for the microcrystalline glass according to any one of the above mentioned, the intermediate layer contains fluorinated alkali metals or fluorinated alkaline earth metals compounds; alternatively, uses an intermediate layer formed by ionic crystals selected from fluoro-silicide alkali metal and fluoro-silicide alkali earth metal as the original coating material.

Preferably, as for the microcrystalline glass according to any one of the above mentioned, the intermediate layer is an ionic crystal intermediate layer with a lattice energy less than 1050 KJ/mol and preferably less than 940 kJ/mol.

Preferably, as for the microcrystalline glass according to any one of the above mentioned, the intermediate layer is a crystal formed by at least one ionic crystal of LiF, NaF and/or KF as the original coating material; or an intermediate layer formed by at least one of $MgF_2$, $CaF_2$, $SrF_2$ or $BaF_2$ as the original coating material; or a fluoride intermediate layer formed by at least one of $Li_2SiF_6$, $Na_2SiF_6$, $K_2SiF_6$, $Rb_2SiF_6$, $Cs_2SiF_6$, $BeSiF_6$, $MgSiF_6$, $CaSiF_6$, $SrSiF_6$, or $BaSiF_6$ as the original coating material through coating; preferably, is the intermediate layer formed by NaF or KF ionic crystal as the original coating material.

Preferably, as for the microcrystalline glass according to any one of the above mentioned, the intermediate layer is a polar or non-polar compound; preferably a polar compound.

Preferably, as for the microcrystalline glass according to any one of the above mentioned, the thickness of the intermediate layer is 1-5 nm, preferably 1-2 nm. Preferably, as for the microcrystalline glass according to any one of the above mentioned, the thickness of the bottom layer is 3-15 nm, preferably 5-10 nm, and more preferably 5-8 nm.

Preferably, as for the microcrystalline glass according to any one of the above mentioned, the thickness of the water-repellent oil-repellent layer is not less than 10 nm, preferably not less than 15 nm, which can be 10 nm-25 nm.

Preferably, as for the microcrystalline glass according to any one of the above mentioned, characterized in that when the bottom layer is a multilayer bottom layer, the compound containing si-O bond or the mixed silicon oxide layer is as the outermost bottom layer, the mixed silicon oxide is a mixture of silicon oxide $SiO_x$ and oxides of at least one other element other than silicon and/or magnesium fluoride, wherein x is less than or equal to 2;

preferably, the other element is aluminum, tin, magnesium, phosphorus, cerium, zirconium, titanium, cesium, barium, strontium, niobium, zinc or boron element(s); more preferably the mixed silicon oxide is a mixture of silicon oxide $SiO_x$ and aluminum oxide.

Preferably, as for the microcrystalline glass according to any one of the above mentioned, the compound containing Si—O bond is $SiO_x$, wherein x is less than or equal to 2; or any one of SiOC, SiON, SiOCN and/or $Si_3N_4$, or hydrogen bond bonded to any of $SiO_x$, SiOC, SiON and/or SiOCN in any proportion, wherein x is less than or equal to 2.

Preferably, as for the microcrystalline glass according to any one of the above mentioned, the water-repellent oil-repellent layer is a fluorine-based polymer layer, preferably a fluorine-containing polyether silicon oxide layer with a molecular weight not less than 2000; preferably the coating thickness is not less than 10 nm.

Preferably, as for the microcrystalline glass according to any one of the above mentioned, the microcrystalline glass composition contains oxides in the following mol % portions:

$SiO_2$: 40-75%, preferably 45-72%;
$Al_2O_3$: 2-20%, preferably 4-15%;
$B_2O_3$: 0-20%, preferably 0.4-1.6%;
$P_2O_5$: 0-10%, preferably 0.8-1.5%;
$ZrO_2+TiO_2$: 0-15%, preferably 0.9-4%;
MgO: 0-5%, preferably 0.1-2%;
ZnO: 0-4%, preferably 0.9-3.0%;
rare earth oxide: 0-5%, preferably 0.01-1%;
$Na_2O$: 0-5.5%;
$K_2O$: 0-4%;
$Li_2O$: 2-34%, preferably 10-34%; and
$Na_2O+K_2O+Li_2O$: 4-40%, preferably 15-40%.

Preferably, as for the microcrystalline glass according to any one of the above mentioned, the rare earth oxide is selected from more than one or two of $CeO_2$, $Y_2O_3$, $La_2O_3$, $Ta_2O_3$, $Tm_2O_5$ and $Nd_2O_5$.

Preferably, as for the microcrystalline glass according to any one of the above mentioned, the microcrystalline glass can also contain coloring additives; preferably, the coloring additive is selected from more than one of $Nd_2O_3$, $Fe_2O_3$, CoO, NiO, $V_2O_5$, $MnO_2$, $TiO_2$, CuO and $Cr_2O_3$.

Preferably, as for the microcrystalline glass according to any one of the above mentioned, characterized in that, preferably, coloring additives shall not exceed 5% molar content relative to the overall composition of the glass; preferably, in the molar content relative to the overall composition of the glass, the coloring additive contains more than 0.5 mol % CoO and/or $Cr_2O_3$, and preferably contains more than 1 mol % one selected from any of $Fe_2O_3$, NiO or $MnO_2$.

Preferably, as for the microcrystalline glass according to any one of the above mentioned, the microcrystalline glass contains a clarifying agent; preferably, the clarifying agent is selected from more than one of $As_2O_3$, $Sb_2O_3$, $SnO_2$, chloride, fluoride, compounds containing $SO_3^-$, and the compounds containing $NO_3^-$, preferably selected from more than one of $SnO_2$, compounds containing $SO_3^-$, chloride, and the compounds containing $NO_3^-$; preferably the content of the clarifying agent is 0-2 mol %.

Preferably, as for the microcrystalline glass according to any one of the above mentioned, the primary crystal phase of the microcrystalline glass is selected from more than one or two of beta quartz solid solution, beta spodumene solid solution, beta lithium nepheline, spinel, rutile, mullite, olivine, enstatite, cordierite, petalite, lithium silicate, lithium disilicate, silica, zirconia, magnetite; preferably the Average crystal grain size is less than 100 nm, preferably less than or equal to 50 nm, especially preferably less than or equal to 30 nm.

Preferably, as for the microcrystalline glass according to any one of the above mentioned, the microcrystalline glass is a glass with or without ion exchange.

Further preferably, as for the microcrystalline glass according to any one of the above mentioned, the microcrystalline glass is a glass ceramic with a crystallinity of less than 60%.

The present invention also provides a preparation method of the microcrystalline glass according to any one of the above mentioned, including the following steps:

1) coating microcrystalline glass with a layer containing Si—O oxide or mixed silicon oxide, to form a bottom layer on the surface of the microcrystalline glass;
2) an intermediate layer is coated on the surface of the bottom layer obtained in Step 1);
3) a water-repellent and oil-repellent layer is coated on the surface of the intermediate layer obtained in Step 2).

Preferably, as for the preparation method according to any one of the above mentioned, characterized in that the coating uses vacuum evaporation coating method.

Preferably, as for the preparation method according to any one of the above mentioned, characterized in that the microcrystalline glass is an ion-exchanged microcrystalline glass.

Preferably, as for the preparation method according to any one of the above mentioned, characterized in that the microcrystalline glass is fired by a method containing the following steps before coating the bottom layer, the intermediate layer and the water-repellent and oil-repellent layer:

(I) the glass materials are melted at 1600±50° C., and then annealed at 400-650° C. to get a homogenized mother glass plate;
(II) the mother glass plate is formed into a molding mother glass plate by an overflow flow, float or calendering process; and
(III) the molding mother glass plate is micro crystallized by secondary heat treatment to give a microcrystalline glass preform, then it is ion exchanged or directly used as the raw material of microcrystalline glass without ion exchange, for coating the needed bottom layer, the intermediate layer and the water-repellent and oil-repellent layer on its surface coating layer, wherein the first heat treatment temperature is 500-1000° C., the secondary heat treatment temperature is 550-1100° C.

Preferably, as for the use of the microcrystalline glass according to any one of the above mentioned or the microcrystalline glass obtained by the preparation methods according to any one of the above mentioned in mobile phone display screen, laptop display screen, notebook display screen, handheld game consoles, portable digital device, on-board display screen, windshield or camera screen.

The present invention can form a firm, durable and excellent water-repellent and oil-repellent coating film even if the coating interface of microcrystalline glass has very few Si—O structure, and can achieve excellent water-repellent and oil-repellent property regardless of whether the high-crystallinity glass has done ion exchange or not.

BRIEF DESCRIPTION OF THE DRAWINGS

FIG. 1 is the reaction process diagram of the connection of hydrolysis product of PFPE and glass.

DETAILED DESCRIPTION OF THE INVENTION

The composition of microcrystalline glass looks very similar to that of ordinary inorganic glass, which is generally $SiO_2 < 70$ wt %, as if in accordance with the traditional coating method, it should be able to prepare a good water-repellent and oil-repellent film. But since there are a large number of crystal in the body of microcrystalline glass, $SiO_2$ usually enters into crystal during the formation of microcrystalline glass, which changes structure, resulting in that Si—O could not be released very well and combined with the water-repellent and oil-repellent layer. And the proportion of these tiny crystals usually accounts for 20-100%, that is to say, when the proportion of crystal is higher, the glass phase in the crystalline glass would decrease. The great decrease of Si—O on the interface is the main reason for the low quality of the water-repellent and oil-repellent layer. The invention provides a solution to solve such "rootless" problem.

In particular, the invention provides the following technical solutions:

A composite coating layer designed for water-repellent and oil-repellent film on surface of microcrystalline glass or glass ceramic with a high crystallinity, it is formed in turn starting from the outmost surface: a water-repellent and oil-repellent layer→an intermediate layer→a bottom layer on the glass, that is to say, the bottom layer is in the microcrystalline glass or glass ceramic, and the water-repellent and oil-repellent layer is at the outermost.

That is to say, the method of the invention realizes the formation of water-repellent and oil-repellent film even when the crystallinity of microcrystalline glass or glass ceramic up to more than 60%, the crystallinity of the microcrystalline glass or glass ceramic can be more than 60%, also can be more than 70%, especially also can be more than 80%. Of course, since the invention solves the problem that it is difficult to form a water-repellent and oil-repellent film when the crystallinity of microcrystalline glass or glass ceramic up to more than 60%, as for the situation that the crystallinity of microcrystalline glass or glass ceramic is less than 60%, it also can form an excellent water-repellent and oil-repellent film composite coating on it by using the method of the present invention.

Wherein, preferably, the intermediate layer is an ion crystal with a lattice energy of 700-3000 kJ/mol (according to the lattice energy size, the ion crystal layer used as the intermediate layer or the composition thereof is preferably defined within the fluorinated alkali metal and fluorinated alkaline earth metal), preferably greater than or equal to 725 kJ/mol, more preferably greater than or equal to 770 kJ/mol (radioactive materials are excluded).

The lattice energy/(kJ·mol-1) of some common ion crystals is shown in Table A below.

TABLE A

| Lattice energy of ionic crystal (kJ · mol−1) | | | | |
| --- | --- | --- | --- | --- |
| | F− | Cl− | Br− | I− |
| Li+ | 1036 | 853 | 807 | 757 |
| Na+ | 923 | 786 | 747 | 704 |

TABLE A-continued

| Lattice energy of ionic crystal (kJ · mol−1) | | | | |
| --- | --- | --- | --- | --- |
| | F− | Cl− | Br− | I− |
| K+ | 821 | 715 | 682 | 649 |
| Rb+ | 785 | 689 | 660 | 630 |
| Cs+ | 740 | 659 | 631 | 604 | wherein, preferably, the lattice energy of the ion crystal is preferably less than 1050 kJ/mol (substantially preferably the ion crystal layer is defined within LiF, NaF, KF of the fluorinated alkali metal); more preferably less than 940 kJ/mol (preferably substantially the ionic crystal layer is defined within NaF/KF);

The intermediate layer can also be made of the fluorine-silicified alkali metals and the fluorine-silicified alkaline earth metals such as $Li_2SiF_6$, $Na_2SiF_6$, $K_2SiF_6$.

Wherein, preferably, the intermediate layer is a polar and non-polar compound (preferably fluorinated alkali metal is non-polar, and fluorinated alkaline earth metal is polar);

wherein, further preferably, the compound is a non-polar compound (preferably limited to fluorinated alkali metal—non-polar);

wherein preferably, the thickness of the intermediate layer is 1-5 nm, preferably 1-2 nm;

wherein, preferably, the bottom layer comprises Si compound or is composed of Si compound, the Si compound is preferably selected from:

$SiO_x$, wherein x is less than or equal to 2; in the case of multiple layers, at least the outermost or uppermost layer comprises a silicon oxide or is composed of silicon oxide;

SiOC, SiON, SiOCN, and $Si_3N_4$, and hydrogen bond bonded with $SiO_x$, SiOC, SiON and SiOCN in any proportion, (the "hydrogen bond" herein refers to the hydrogen bond formed by any component in air such as water, and the silicon oxide of the glass), wherein x is less than or equal to 2; or mixed silicon oxide, formed by silicon oxide $SiO_x$ and oxide of at least one other element except silicon and/or magnesium fluoride, wherein the other element is preferably selected from at least one of aluminium, tin, magnesium, phosphorus, cerium, zirconium, titanium, cesium, barium, strontium, niobium, zinc, boron; especially preferably a mixture of silicon oxide $SiO_x$ and oxide of at least one element aluminium, wherein x is less than or equal to 2;

wherein, preferably, the total thickness of the bottom layer is 3-15 nm, preferably 5-10 nm, more preferably 5-8 nm.

Wherein the water-repellent and oil-repellent layer is also called AF layer (anti-fingerprint layer); the AF layer is a layer formed by fluorine-based polymers; the fluorine-based polymer can be selected from perfluoropolyether; vinylidene fluoride polymer, tetrafluoroethylene polymer, hexafluoropropylene polymer; chlorotrifluoroethylene polymer and combinations thereof, preferably can be perfluoropolyether (abbreviated as PFPE). More preferably, the water-repellent and oil-repellent layer is PFPE with a molecular weight not less than 2000, the thickness of the coating layer is not less than 10 nm, preferably not less than 15 nm, and can be 10 nm-25 nm.

In addition, preferably, the above microcrystalline glass is transparent or non-transparent, before or after ion exchange, namely is with pre-stress or not with pre-stress.

In addition, preferably, according to the method of at least one of the above technical solution, wherein the microcrystalline glass has the following glass composition or is the glass composed of the following (by mol %):
SiO2: 40-75%, preferably 45-72%;
Al2O3: 2-20%, preferably 4-15%;
B2O3: 0-20%, preferably 0.4-1.6%;
P2O5: 0-10%, preferably 0.8-1.5%;
ZrO2+TiO2: 0-15%, preferably 0.9-4%;
MgO: 0-5%, preferably 0.1-2%;
ZnO: 0-4%, preferably 0.9-3.0%;
rare earth oxide: 0-5%, preferably 0.01-1%;
Na2O: 0-5.5%;
K2O: 0-4%;
Li2O: 2-34%, preferably 10-34%; and
Na2O+K2O+Li2O: 4-40%, preferably 15-40%.

Wherein the rare earth oxide is selected from one or more than two of CeO2, Y2O3, La2O3, Ta2O3, Tm2O5 and Nb2O5.

In addition, in some preferred examples, the above glass composition may contain: coloring oxide additive, such as Nd2O3, Fe2O3, CoO, NiO, V2O5, MnO2, TiO2, CuO and Cr2O3; the rare earth oxide with a content of 0-5 mol % or a content of 0-5 mol % for the black glass; and a clarifying agent with a content of 0-2 mol %, such as more than one of As2O3, Sb2O3, SnO2, compound containing Cl—, compound containing F—, compound containing SO3-, and compound containing NO3-.

In addition, in some preferred examples, according to the method of at least one of the above technical solution, wherein the preferred primary crystal phase of the microcrystalline glass is selected from one or more of beta quartz solid solution, beta spodumene solid solution, beta lithium nepheline, spinel, rutile, mullite, olivine, enstatite, cordierite, petalite, lithium silicate, lithium disilicate, silica, zirconia, magnetite; wherein the average crystal grain size is less than 100 nm, preferably less than or equal to 50 nm, especially preferably less than or equal to 30 nm.

The present invention uses a combination of a bottom layer such as a $SiO_2$ layer or a $SiO_x$ layer or a silicon oxide-containing mixture layer (collectively referred to as a "silicon oxide layer"; SiO2 is listed as an example herein, however it is not limited to SiO2 actually)+an intermediate layer (referred to as "RF layer", NaF is listed as an example)+a water-repellent and oil-repellent layer such as PFPE: wherein the SiO2 layer cannot be too thick; about 5 nm, not more than 15 nm, SiO2 is meshy or chain structure under the micro-observation; the SiO2 coating layer of 5 nm is very thin; the SiO2 coating layer also can retain the mesh in structure thereof (if the coating is too thick; which will cause the mesh disappear since the SiO2 coating layer are overlapped with each other); the thinner intermediate layer RF is re-coated, RF is a compound with a lattice energy not too high, especially a non-polar compound, RF is selected from compounds with a lattice energy not too high, and RF is easy to react with water in the atmosphere to form $R^+$, $F^-$, $H^+$, $OH^-$;

RF+H<sub>2</sub>O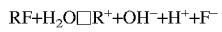R<sup>+</sup>+OH<sup>-</sup>+H<sup>+</sup>+F<sup>-</sup> since there is hollow in the bottom layer, $R^+$, $F^-$, $H^+$, $OH^-$ can be very easy to permeate to the interface of the microcrystalline glass and react with Si—O—Si structure in the crystal, opening the Si—O in the crystal structure to form a base which can well react with the water-repellent and oil-repellent layer to form the film:

≡S—O—SI≡+R<sup>+</sup>+OH<sup>-</sup>→≡Si—OH+RO—Si≡

≡Si—O—Si≡+H++F<sup>-</sup>→SiF4+H2O→H2SiO3+ H2SiF6

If the microcrystalline glass interface and the bottom layer generate enough Si—O tightly connected with the microcrystalline glass base, when reacting with the uppermost layer of the water-repellent and oil-repellent layer PFPE, it will generate enough valence bond to connect, so as to greatly increase water-repellent and oil-repellent layer performance and wear resistance.

The intermediate layer with a suitable lattice energy is the key of the working principle of the invention; the lattice energy is slightly lower; the intermediate layer is active; it is easy to react; proper lattice energy can keep materials stable, the intermediate layer of the invention should be limited in a certain lattice energy range, the hydrolysis and activity of the intermediate layer material in such lattice energy range are high, after hydrolysis it has a certain corrosiveness, so it cannot be coated too thick, otherwise, not too much, generally not more than 5 nm. If it is coated too thick, the reaction product cannot be consumed in the whole reaction process, which will be corroded in the glass, causing serious corrosion point on the glass surface, also causing the reduce of weather resistance of the coating layer.

The term "microcrystalline glass or glass ceramic":

In the present invention, the "microcrystalline glass" and "glass ceramic" have the same meaning, refers to glass which is different from the glass without crystal phases or amorphous. Both of them refer to the glass with crystal phase. Thus, the term "microcrystalline glass or glass ceramic", "microcrystalline glass" or "glass ceramic" appearing in the specification of the present invention have the same meaning.

With regard to lattice energy:

The lattice energy refers to the energy absorbed when the ionic crystal becomes gaseous positive ions and gaseous negative ions in a standard condition, which is a parameter for measuring the stability of the lattice. The factors affecting the size of the lattice energy are ion radius, ion charge and the electron layer configuration of the ion and so on. Referring to the method for calculating lattice energy in the literature of "alkaline earth metal halide lattice energy and magnetic susceptibility of topological research" edited by Qin Zhenglong, Liu Changchun, the following formula is obtained by fitting:

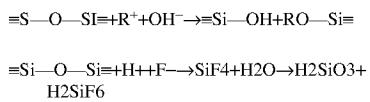

$^nF$ is topological index; E is valence electron energy level value.

The fluoride lattice energy (KJ/mol) calculated by this method is shown in Table B below.

TABLE B

| lattice energy of fluoride (KJ/mol) | | | | | |
|---|---|---|---|---|---|
| | Fluorinated alkali metal | | | | |
| | LiF | NaF | KF | RbF | CsF |
| Theoretical value Exp | 1032 | 915 | 811 | 777 | 748 |
| Calculated value Cal | 1036 | 904 | 814 | 780 | 748 |

TABLE B-continued

| lattice energy of fluoride (KJ/mol) | | | | | |
|---|---|---|---|---|---|
| | Fluorinated alkaline earth metals | | | | |
| | $BeF_2$ | $MgF_2$ | $CaF_2$ | $SrF_2$ | $BaF_2$ |
| Theoretical value Exp | 3476 | 2949 | 2617 | 2482 | 2330 |
| Calculated value Cal | 3478 | 2945 | 2627 | 2409 | 2249 |

The regression equation obtained by fitting the method has a good correlation, and is also suitable for calculating the lattice energy of the fluorine silicide, and the result is as shown in Table C.

TABLE C

| Lattice energy of fluorosilicon compounds (KJ/mol) | | | | | |
|---|---|---|---|---|---|
| | Fluorosilicide alkali metals | | | | |
| | $Li_2SiF_6$ | $Na_2SiF_6$ | $K_2SiF_6$ | $Rb_2SiF_6$ | $Cs_2SiF_6$ |
| Calculated value Cal | 9974 | 9740 | 9532 | 9464 | 9406 |
| | Fluorosilicide alkaline earth metals | | | | |
| | $BeSiF_6$ | $MgSiF_6$ | $CaSiF_6$ | $SrSiF_6$ | $BaSiF_6$ |
| Calculated value Cal | 11386 | 10859 | 10527 | 10392 | 10240 |

It should be particularly pointed out that the original material of the coating film is not necessarily the same concept as the substance formed on the bottom layer of the glass interface. Taking the above calculated fluorine silicide alkali metal $R_2SiF_6$ as an example, generally $R_2SiF_6$ is a relatively stable solid at normal temperature, it will decompose when coating, heating to about 300° C.: $R_2SiF_6 \rightarrow RSi + SiF_4$ (gas), that is to say the material seems one with a high lattice energy, but after forming film, the substance which can play a key role has produced a qualitative change, and the crystal lattice thereof may be within the best working range claimed by the invention. For example, fluosilicate sodium $Na_2SiF_6$ is a white particle or crystalline powder, scentless, tasteless; while it will decompose into sodium fluoride NaF and silicon tetrafluoride $SiF_4$ after heating (more than 300° C.).

Based on the principle described in the present invention, whether the interface of the coated microcrystalline glass is subjected to ion exchange or not has no effect on the implementation and effect of the present invention. The small ions in the glass must be able to exchange with the large ions in the external salt bath in a state where the ions can be moved. In order to realize ion movement, temperature is a key factor, generally glass phase is relatively easy to realize ion movement at a relatively low temperature (e.g., started at about 200° C., which is lower than the strain point temperature, such as 360° C.), and the alkali metal element in the microcrystal phase is a part of the crystal structure before becoming a movable ion; it needs higher energy to break the limitation of crystal structure to move, becoming a free exchanged ion, the temperature is generally closer to the softening point of the glass (such as more than 600° C.). Therefore, most often ion exchange occurs in the glass phase; when the temperature of the salt bath is extremely high, it is also first occurring in the glass phase; and then occurring in the crystal.

The glass phase of the high crystallinity microcrystalline glass of the present invention is very few, even if there is a few glass phase, and also has ion exchange, the ion entering the glass phase is very few, resulting in that the ability to change the Si—O structure of glass phase and coordination ability is very tinny and local. Therefore, it has a small influence on the valence bond formation of the coating film of the present invention. That is to say whether high crystallinity glass has been subjected to ion exchange or not, the interface is lack of Si—O structure, and the invention is made by aiming at such application scene. If the high temperature is used, the ions in the crystal will take part in the ion exchange, that is to say, the crystal is damaged, so the Si—O in the crystal will be opened, which is beneficial to form valence bond of the coating film of the present invention. The problem precisely solved by the present invention is how to form a firm, durable, and excellent water-repellent and oil-repellent coating film when the coating interface of microcrystalline glass has very few Si—O structure, and it will not affect the implementation of the invention whether the high crystallinity glass has been subjected to ion exchange or not.

With regard to the preparation method of the microcrystalline glass or glass ceramic of the present invention with a water-repellent and oil-repellent layer on the surface thereof, it is specifically explained as follows.

The glass having the following composition is fired according to the following method to obtain a microcrystalline glass or a glass ceramic.

$SiO_2$: 40-75%, preferably 45-72%;
Al2O3: 2-20%, preferably 4-15%;
B2O3: 0-20%, preferably 0.4-1.6%;
P2O5: 0-10%, preferably 0.8-1.5%;
ZrO2+TiO2: 0-15%, preferably 0.9-4%;
MgO: 0-5%, preferably 0.1-2%;
ZnO: 0-4%, preferably 0.9-3.0%;
rare earth oxide: 0-5%, preferably 0.01-1%;
Na2O: 0-5.5%;
K2O: 0-4%;
Li2O: 2-34%, preferably 10-34%; and
$Na_2O+K2O+Li_2O$: 4-40%, preferably 15-40%.
wherein the microcrystalline glass or glass ceramic is fired by a method containing the following steps:
(I) the glass materials are melted at 1600±50° C., and then annealed at 400-650° C. to get a homogenized mother glass plate;
(II) the mother glass plate is formed into a molding mother glass plate by an overflow flow, float or calendering process; and
(III) the molding mother glass plate is micro crystallized by secondary heat treatment to give a microcrystalline glass preform, wherein the first heat treatment is carried out for 0.5-5 h at 500-1000° C., the secondary heat treatment is carried out for 0.5-6 h at 550-1100° C., then
(IV) the microcrystalline glass preform is ion exchanged or directly used for coating the needed bottom layer, the intermediate layer and the water-repellent and oil-repellent layer on its surface without ion exchange.
wherein the ion exchange uses conventional method for ion exchange, for example, a mixed molten salt containing 10-75 wt % of NaNO3 and 25-90 wt % KNO3 by weight can be used for performing ion exchange for 5-10 h in the temperature range of 380–500° C.

Specifically, the firing method comprises the following steps: firstly the glass raw materials are weighed and melted at a high temperature of 1600±50° C., then annealed at about 400° C. to 650° C. to homogenize the glass, formed to give the microcrystalline glass substrate, microcrystalline glass substrate also can be referred to as the mother glass plate, which is a glass plate not subjected to the crystallization processing; and the microcrystalline glass substrate does not contain crystal. According to the high temperature viscosity and material property, it can adopt an overflow flow, float or calendering process for formation, the thickness of the obtained mother glass plate is between 0.1 to 5 mm. It also can be formed into plate shape by cutting after forming into block-shaped annealing.

After forming the microcrystalline glass substrate, the microcrystalline glass substrate is subjected to secondary heat treatment for micro-crystallization, to prepare the microcrystalline glass preform, wherein the first heat treatment is carried out for 0.5-5 h at 500-1000° C., the secondary heat treatment is carried out for 0.5-6 h at 550-1100° C. After crystallization, it forms the needed microcrystalline glass or glass ceramic; which is then subjected to ion exchange or not performing ion exchange directly into the vacuum coating machine PVD, with set parameter condition of the coating film, coating the bottom layer, the intermediate layer and the water-repellent and oil-repellent layer in turn. The process in the vacuum coating machine is: loading glass on the shelf-vacuumizing-plasma cleaning-evaporation—emptying (vacuumizing to atmospheric pressure)—off the shelf.

It will be described in detail how to prepare the chemically strengthened glass of the invention and the stress performance characteristics of the chemically strengthened glass of the invention through the following examples.

The first part of the examples: glass preparation example How the glass substrate prepared is introduced by taking example 1 as an example.

(1) all materials of the example 1 shown in Table 1 below were mixed, and the mixture was put into the platinum crucible, melted at 1600° C. for 5 h in the high temperature lifting furnace, then poured in the pre-heated stainless steel mould, and then put in the annealing furnace for annealing at 580° C. for 24 h; to eliminate the internal stress of the glass. Six sides of the glass brick after annealing were cut, to give a glass brick, then subjected to size fine cut, flat grind, sweep by using wire cutting machine, CNC fine carving machine, flat grinding machine, polishing machine, to give a mother glass plate with a size of 155 mm×78 mm×0.65 mm.

Wherein, the specification of the instruments adopted in the above procedure was as follows:
- Multi-wire cutting machine: ch5625, Taizhou Chenhong Numerical Control Equipment Manufacturing Co., Ltd.;
- CNC fine carving machine: CN-650, Shandong Chiano Numerical Control Equipment Co., Ltd.;
- Flat grinding machine: YJ-13B6LD, Hunan Ningjing Machinery Co., Ltd., and Polishing machine: YJ-13B6PD, Hunan Ningjing Machinery Co., Ltd.

(2) firstly, the mother glass plate was first heat treated in the glass substrate temperature lifting furnace at 650° C. for 3 h to form crystal nucleus; then secondary heat treated at 730° C. for 3 h to precipitate crystal, so as to obtain the glass ceramic. The glass ceramic was subjected to crystal analysis, comprising crystallinity, the crystal type (that is the primary crystal phase and the secondary crystal phase type), and ratio of the primary crystal phase and the secondary crystal phase; Average crystal grain size, and the Vickers hardness, fracture toughness, visible light average transmittance and haze of the test glass ceramic (hereinafter also referred to as "glass ceramic without ion exchange") were also tested at the same time.

(3) the glass ceramic was subjected to ion exchange; mixed salt bath of 40 wt % NaNO3 and 60 wt % KNO3 was used as the molten salt; the strengthening temperature (namely ion exchange temperature) was 380° C.; the strengthening time was 9 h, after strengthening, the sample was taken out and cleaned to give the reinforced glass ceramic (hereinafter also called "glass ceramic having been ion exchanged").

(4) the obtained reinforced glass ceramic was subjected to corresponding characterization test, comprising haze, visible light average transmittance, surface pressure stress, pressure stress depth and Young's modulus test, specific test results were shown in Table 3.

wherein the definitions and test methods of crystallinity, primary crystal phase, secondary crystal phase, average crystal grain size, Vickers hardness, fracture toughness, visible light average transmittance, haze, surface pressure stress, pressure stress depth and Young's modulus were specifically described as follows:

The surface pressure stress was that the glass was chemically strengthened, the alkali metal ion with a smaller surface radius was replaced by the alkali metal ion with a larger radius; due to the plug effect of the alkali metal ion with a large radius, a pressure stress was generated on the surface of the glass, called surface pressure stress.

Crystallinity: the diffraction peak curve was obtained by XRD diffraction analysis, wherein the incident angle range was 2Theta=10~50 degrees; the scanning speed was 6 degrees/min, the device used in the example was Shimadzu XRD-6000. The crystallinity was calculated according to formula (1-1):

$$X_c = \frac{I_c}{(I_c + KI_a)} \quad (1\text{-}1)$$

wherein, Ic was the diffraction integral intensity of crystalline part with 2Theta=10~50 degrees of the microcrystalline glass sample;

Ia was the diffraction integral intensity of amorphous part with 2Theta=10~50 degrees of the microcrystalline glass sample;

K was the relative scattering factor in unit mass of the crystalline part and the amorphous part with 2Theta=10~50 degrees of the microcrystalline glass sample.

Primary crystal phase ratio: in glass ceramics, the crystal phase with the highest percentage relative to other crystal phases in terms of weight.

Secondary crystal phase ratio: in addition to the primary crystal phase, one or more other crystal phases may be present in the ceramic portion of the glass ceramic, and the weight percent of the secondary crystal phase was less than that of the primary crystal phase.

Average crystal grain size: the average length of crystal grain in the microcrystalline glass observed at 100,000 million times magnification, which was observed and measured by Transmission electron microscopy (Model: ThermoFisher Scientific (original as FEI) Talos F200S). During the measurement, it was equivalent to taking an enlarged photo of a certain part of the grain. There were limited grains in the enlarged photo area. The size of the limited grains was marked according to the scale and then the average was calculated. In examples of the present invention, it was measured at a magnification of 500,000 times.

Vickers hardness: vickers hardness tester was used to test the Vickers hardness, in accordance with the standard test in Gb/T 37900-2019 *Ultra-Thin Glass Hardness and Fracture Toughness Test Method, Vickers Hardness Indentation Method Under Small Load*, the device used in the example was a digital display small load Vickers hardness tester VTD405 (Beijing Weiwei Technology Co., LTD.).

Fracture toughness: represented dent measurement results. After the test sample was polished, the conical diamond indenter on vickers hardness tester pressed the sample at 300N load P for 10 seconds to create an indentation, in this way, the indentation vertex will produce the corresponding crack. The fracture toughness value Kw was calculated according to the indentation load P and the crack propagation length C. The specific fracture toughness was calculated according to the standard test of Gb/T 37900-2019 *Ultra-Thin Glass Hardness and Fracture Toughness Test Method Vickers Hardness Indentation Method Under Small Load*.

Surface pressure stress (MPa): the surface pressure stress of glass was tested by FSM-6000LE waveguide optical stress tester manufactured by ORIHARA Company in Japan.

Pressure stress depth (μm): distance from the glass surface to the position of zero pressure stress.

Haze: the percentage of the transmitted light intensity that deviates more than 2.5° from the incident light to the total transmitted light intensity, which was measured by colorimeter (model CM-3600A).

Visible light transmittance: the ratio of the radiant energy projected through the object to the total radiant energy projected to the object in the process of the incident light flux leaving the illuminated surface or the incident surface of the medium to the other side within the range of visible light band.

Visible light average transmittance: the value obtained by measuring transmittance of each wavelength at 10 nm wavelength intervals within a specific wavelength range, then the sum of measured transmittance of each wavelength was divided by the number of measured transmittance of each wavelength. For example, the average transmittance of 360-400 nm wavelength was calculated as follows: the transmittance at 360 nm, 370 nm, 380 nm, 390 nm and 400 nm were measured respectively. The number of measured transmittance of 360-400 nm is 5. Then the sum of the above transmittance was divided by 5 to get the average transmittance of 360-400 nm wavelength.

Young's modulus (Gpa): the young's modulus of the sample were tested by acoustic wave method, the device was IET-1600P high temperature elastic modulus tester.

Examples 2-13

Preparation steps were same as those in Example 1, while the differences therebetween were shown in table 1 and table 2 and table 3, that is, the specific composition of glass formula for each glass, and the heat treatment process condition of step (2) and performance test of the obtained glass ceramic, as well as the step (3) ion exchange process conditions and performance test results of the obtained reinforced glass ceramic, were shown in table 1 and table 2 and table 3.

TABLE 1

Raw materials for glass preparation (mol %)

| Example No. | Appearance | $SiO_2$ | $Al_2O_3$ | $Li_2O$ | $Na_2O$ | $K_2O$ | $P_2O_5$ | $B_2O_3$ | MgO | ZnO | $ZrO_2$ | $TiO_2$ | $CeO_2$ | $Y_2O_3$ | $Nb_2O_5$ | $Tm_2O_5$ | $SnO_2$ | NaCl |
|---|---|---|---|---|---|---|---|---|---|---|---|---|---|---|---|---|---|---|
| 1 | transparent | 62.07 | 12.81 | 14.78 | 3.94 | 0.49 | 0.99 | 0.49 | | 0.99 | 2.66 | | 0.30 | | | | 0.30 | 0.20 |
| 2 | transparent | 66.00 | 10.00 | 15.00 | 3.00 | 1.00 | 0.00 | 0.60 | | 1.00 | 2.00 | 1.00 | 0.20 | | | | 0.10 | 0.10 |
| 3 | transparent | 67.80 | 9.97 | 11.96 | 3.99 | 0.20 | 1.50 | 0.50 | | 1.99 | 1.50 | | 0.20 | | | | 0.20 | 0.20 |
| 4 | transparent | 69.58 | 7.95 | 14.91 | 0.00 | 0.99 | 1.49 | 0.50 | | 2.98 | 0.99 | | 0.20 | | | | 0.20 | 0.20 |
| 5 | transparent | 67.99 | 5.83 | 14.57 | 2.91 | 0.97 | 1.46 | 0.97 | 1.94 | 0.97 | 0.97 | | 0.19 | | | 0.83 | 0.19 | 0.19 |
| 6 | transparent | 68.93 | 4.20 | 18.98 | 3.00 | 0.10 | 0.90 | 1.50 | 1.00 | | 1.00 | | 0.20 | | | | | 0.20 |
| 7 | transparent | 69.41 | 4.96 | 20.13 | 0.99 | 1.98 | 0.99 | | 0.10 | | | | 0.20 | | 0.84 | | 0.20 | 0.20 |
| 8 | transparent | 71.99 | 5.00 | 14.20 | 2.00 | 2.00 | 0.90 | 1.50 | | 1.00 | 1.00 | 0.20 | 0.01 | | | | 0.10 | 0.10 |
| 9 | transparent | 64.85 | 8.47 | 20.75 | 1.00 | | 0.82 | 1.51 | | | 1.71 | | 0.50 | | | | 0.20 | 0.20 |
| 10 | transparent | 68.86 | 5.19 | 21.05 | 0.46 | | 0.82 | 1.51 | | | 1.71 | | | | | | 0.20 | 0.20 |
| 11 | transparent | 70.00 | 4.20 | 20.29 | 0.46 | | 1.42 | 0.52 | | | 1.72 | | 1.00 | | | | 0.20 | 0.20 |
| 12 | transparent | 68.66 | 4.12 | 20.68 | 0.15 | | 0.81 | 1.49 | | 2.00 | 1.69 | | | | | | 0.20 | 0.20 |
| 13 | transparent | 46.07 | 7.61 | 33.05 | 5.01 | 1.30 | 1.00 | | 1.00 | | 3.71 | | | 0.85 | | | 0.20 | 0.20 |

TABLE 2

Treatment conditions of mother glass ceramics (unstrengthened glass) and performance parameters of glass ceramics after heat treatment

| Ex No. | first heat treatment temp (° C.) | first heat treatment time (h) | second heat treatment temp (° C.) | second heat treatment time (h) | crystallinity (wt %) | primary crystal phase (crystalline content of 60 wt %-90 wt %) | secondary crystal phase (crystal phase with a content lower than 60 wt %, In order of mass from most to least) | average crystal grain size (nm) | visible light average transmittance (%) | Haze (%) | Vickers hardness (HV) | fracture toughness (MPa·m$^{1/2}$) |
|---|---|---|---|---|---|---|---|---|---|---|---|---|
| 1 | 650 | 3 h | 730 | 3 | 62.1 | β-spodumene (64 wt %) | β-spodumene solid solution (36 wt %) | 15.7 | 89.22 | 0.15 | 753 | 1.66 |
| 2 | 580 | 3 h | 700 | 1 | 62.74 | β-silica (71 wt %) | lithium disilicate (18 wt %); lithium silicate (9 wt %); β-silica solid solution (2 wt %) | 20.8 | 89.35 | 0.20 | 791 | 1.74 |
| 3 | 580 | 3 h | 690 | 1 | 67.3 | β-silica solid solution (85 wt %) | β-silica (15 wt %) | 19.2 | 89.24 | 0.18 | 781 | 1.72 |
| 4 | 630 | 2 h | 690 | 1 | 80.1 | lithium disilicate (75 wt %) | petalite (23wt %); lithium silicate (2 wt %) | 21.4 | 90.1 | 0.16 | 796 | 1.7 |
| 5 | 630 | 2 h | 680 | 1 | 88.52 | lithium disilicate (70 wt %) | petalite (20 wt %); β-silica (10 wt %) | 19.21 | 91.11 | 0.18 | 743 | 1.6 |
| 6 | 630 | 2 h | 680 | 2 | 84.5 | petalite (72 wt %) | lithium disilicate (12 wt %); lithium silicate (10 wt %); β-silica (6 wt %) | 18.5 | 91.48 | 0.17 | 744 | 1.6 |
| 7 | 620 | 4 h | 740 | 1 | 88.32 | petalite (70 wt %) | lithium disilicate (17 wt %); lithium silicate (13 wt %) | 20.1 | 90.61 | 0.12 | 761 | 1.7 |
| 8 | 590 | 4 h | 680 | 2 | 90.35 | β-silica (80 wt %) | lithium silicate (11 wt %); β-silica solid solution (9 wt %) | 19.4 | 90.35 | 0.15 | 749 | 1.9 |
| 9 | 580 | 4 | 710 | 4 | 60.8 | petalite (65 wt %) | lithium disilicate (33 wt %); lithium silicate (2 wt %) | 19.6 | 89.65 | 0.15 | 725 | 1.4 |
| 10 | 570 | 4 | 690 | 4 | 64.7 | lithium disilicate (88 wt %) | petalite (10 wt %); lithium silicate (2 wt %) | 17.8 | 90.85 | 0.12 | 718 | 1.4 |
| 11 | 565 | 4 | 660 | 4 | 87.9 | petalite (83 wt %) | lithium disilicate (10 wt %); lithium silicate (7 wt %) | 17.3 | 91.06 | 0.09 | 738 | 1.7 |
| 12 | 565 | 4 | 660 | 4 | 71.6 | petalite (61 wt %) | lithium disilicate (35 wt %); lithium silicate (4 wt %) | 25.5 | 89.41 | 0.16 | 729 | 1.6 |
| 13 | 580 | 4 | 710 | 4 | 61.2 | β-silica (78 wt %) | lithium silicate (11 wt %); β-silicasolid solution (9 wt %); zirconia (2 wt %) | 19.9 | 90.85 | 0.12 | 725 | 1.7 |

As can be seen from table 2 above that, the crystallinity of the glass ceramics obtained by heat treating the mother glass obtained in the present invention was as low as 61.2% and as high as 90.35%, the visible light transmittance was between 89-92%, the average crystal grain size was between 15.7 nm-25.5 nm, and the haze was between 0.09-0.20%. Vickers hardness was 718-796 hV and fracture toughness was 1.4-1.9 MPa·M$^{1/2}$.

toxicity. Fluoride can also be used as a clarifying agent, but was not preferred due to its corrosiveness Generally, $SnO_2$, $SO_3$ (such as $Na_2SO_4$), Cl compounds (such as NaCl), and compounds containing $NO_3^-$ (such as $NaNO_3$) were commonly used alone or in combination as clarifying agents, the amount thereof was generally less than 1 mol %.

The second part of examples: water-repellent and oil-repellent composite coating layer preparation examples

TABLE 3

Conditions of ion exchange of mother glass and properties of reinforced glass obtained by ion exchange

| Example No. | Primary reinforcing process | | | | Reinforced glass ceramic properties | | | |
|---|---|---|---|---|---|---|---|---|
| | $NaNO_3$ (wt %) | $KNO_3$ (wt %) | temperature of ion exchange (° C.) | total time of ion exchange (h) | haze % | visible light average transmittance | surface pressure stress (MP) | pressure stress depth (um) | Young modulus test (GPa) |
| 1 | 40 | 60 | 380 | 9 | 0.17 | 89.02 | 314 | 69 | 82 |
| 2 | 60 | 40 | 500 | 5 | 0.20 | 89.24 | 408 | 54 | 94 |
| 3 | 60 | 40 | 500 | 5 | 0.19 | 88.21 | 411 | 58 | 92 |
| 4 | 70 | 30 | 500 | 5 | 0.19 | 89.81 | 390 | 48 | 91 |
| 5 | 70 | 30 | 480 | 8 | 0.19 | 90.43 | 387 | 49 | 84 |
| 6 | 65 | 35 | 450 | 8 | 0.18 | 90.28 | 483 | 42 | 89 |
| 7 | 70 | 30 | 450 | 8 | 0.15 | 90.41 | 468 | 38 | 94 |
| 8 | 65 | 35 | 460 | 5 | 0.17 | 90.05 | 390 | 40 | 86 |
| 9 | 10 | 90 | 450 | 10 | 0.14 | 89.85 | 241 | 95 | 92 |
| 10 | 20 | 90 | 450 | 10 | 0.13 | 90.35 | 198 | 98 | 98 |
| 11 | 20 | 90 | 450 | 10 | 0.09 | 90.96 | 187 | 103 | 101 |
| 12 | 75 | 25 | 450 | 10 | 0.16 | 89.34 | 235 | 110 | 99 |
| 13 | 75 | 25 | 450 | 10 | 0.14 | 90.85 | 725 | 112 | 92 |

It can be seen from the above glass composition that the glass formula can contain rare earth oxides. In particular, any one or more than two kinds of rare earth oxides selected from $CeO_2$, $Y_2O_3$, $La_2O_3$, $Ta_2O_3$, $Tm_2O_5$ and $Nb_2O_5$ can be added according to the invention. The content of these rare earth oxides usually did not exceed 5 mol %. In addition, according to the need, colorants and clarifying agents also can be added, in particular, in the above glass composition, $Nb_2O_3$ plays a colorant role. In the present invention, in addition to $Nb_2O_3$, any one or more of the following substances: $Nd_2O_3$, $Fe_2O_3$, CoO, NiO, $V_2O_5$, $MnO_2$, $TiO_2$, CuO, $CeO_2$ and $Cr_2O_3$ can also be added as colorants. The visible light transmittance of the glass will decrease after the addition of colorant. The more the colorant is added, the lower the transmittance is. Generally speaking, adding proportion was not more than 5 mol %, the overall color and transmittance of glass would obvious change by adding more than 1 mol %, and when adding too much colorant (for example, about 5 mol %), it will affect the crystallinity and crystal size of microcrystalline glass. In the present invention, an additional 1 mol % of arbitrary combination of $Fe_2O_3$, NiO, $MnO_2$ and combination of other colorants in any proportion on the basis of the overall composition of the above example will make the glass black. It will make the glass appear black with blue phase by adding more than 0.5 mol % of any combination of CoO, $Cr_2O_3$ and other colorants in any proportion. It will not affect the other properties of the glass when no more than 5 mol % colorant was used.

In the glass of the present invention, the clarifying agent can be used alone or in combination according to the actual melting situation, and the clarifying agent was selected from more than one of $As_2O_3$, $Sb_2O_3$, $SnO_2$, compound containing $SO_3^-$, fluoride or salt, chloride or salt, and nitrate. Wherein $As_2O_3$ and $Sb_2O_3$ as clarifying agents had good clarifying effect, but they were not preferred due to some 1. The glass ceramic without ion exchange and those with ion exchange in example 4 were respectively used as glass substrates to form composite coating layers The mother glass, that is a number of glass ceramic without ion exchange (i.e. were not treated by the ion exchange in step (3)) (no. as #4-A1 to 4-A15 respectively) and the glass ceramic with ion exchange (i.e. were treated by the ion exchange in step (3)) (no. was #4-B1 to 4-B15 respectively) prepared by using method in Example 4 of the first part were used as the glass substrates, to form a composite coating comprising the SiO2, NaF and AF film. In addition, composite coatings only containing $SiO_2$ and AF film are formed for the above mentioned glass ceramic without ion exchange (no. #4-A16 to 4-A18 respectively) and the glass ceramic with ion exchange (no. #4-B16 to 4-B18 respectively) as the glass substrate. Specifically, the vacuum coating instrument described in Table 4-1 and the coating conditions described in Table 4-2 were used (note: in each example, the coating time was controlled according to the thickness of the target coating layer, and the coating would be stopped when the target thickness was reached), and the composite coating was formed as follows: the surfaces of these glass substrates was cleaned respectively by using ultrasonic cleaning (flat brush cleaning can also be used). After the glass substrate surface was cleaned, vacuum coating method was used to form basically uniform film layer on the substrate surface. Among them, the process of vacuum coating was: the coating glass sample was placed on the umbrella coating shelf, then the umbrella coating shelf was put in the workpiece frame of the machine. $SiO_2$ and NaF coating materials, not mixed, were put in 2 electron gun crucibles inside the vacuum coating machine (a device of hanyi 2050 model electron gun vacuum coating machine was used) separately, to make materials to fill the crucible and flat with the crucible mouth surface. AF film material used to form AF film (anti-fingerprint Glass (AF film)) was put into the anti-evaporation molybdenum boat (600 ml AF liquid was dropped into the crucible filled with steel wool, and the crucible after AF liquid was dried was called AF film material), and the vacuum chamber was closed and vacuumized. When the background vacuum degree reached the vacuum degree specified in the setting process of table 4-2, the equipment automatically enters Ar gas with the amount of Ar gas being 28 sccm. Hanyi homemade Ion Beam Source Hall Ion Source was ran to conduct ion bombardment and the surface of glass was cleaned and sensitized. Then specific conditions such as vacuum degree, ion source voltage, ion source current, neutralization current, Ar and $O_2$ gas ratio, electron gun working current, film forming rate, and coating thickness (among which, coating time parameters were controlled and adjusted when plasma cleaning was carried out before coating) were controlled, which were shown in Table 4-2. According to these conditions, SiO2 and NaF were successively coated (the raw materials of SiO2 and NaF were granular). Subsequently, specific conditions such as vacuum degree, working current of resistance and evaporation, film forming rate and film thickness were controlled as shown in Table 4-2. AF was coated according to these conditions, wherein L5 model $SiO_2$ from Merck was used as coating material for $SiO_2$ film.

NaF provided by Nanyang Yingfukang Photoelectric Material Co., LTD was used for NaF film as coating material; AF film (anti-fingerprint glass) uses KyY1905-1 fluorinated polyether manufactured by Shin-etsu Chemical Industry Co., LTD., Japan as AF main agent (made by Shin-etsu Chemical Industry Co., LTD.) coating material (referred to as "PFPE" film).

After coating, the outer surface of the glass ceramic without ion exchange and the glass ceramic with ion exchange was tested for contact angle. The test results of the thickness and contact angle of the $SiO_2$, NaF and AF films were shown in Table 5-1 and Table 5-2. After coating, the water contact angle, oleic acid contact angle and water drop angle after wear-resistant on the surface of the coating films were measured to investigate the quality and durability of the coating films.

The water contact angle)(° on the surface of AF film was measured according to the method in JIS R 3257(1999).

Wherein the measurement method of oleic acid contact angle on the surface of AF film was: 7 μL drops were placed on the horizontal coating sample, and the cutting angle thereof was measured.

Water droplets were replaced by hexadecane to test the oleic acid contact angle on glass ceramic without ion exchange. The test results for glass ceramic numbered #4-A10, #4-A11 and #4-A12 were as follows:

| Initial Angle (°) | After eraser test (°) |
|---|---|
| 66.2 | 65.4 |
| 66.7 | 65.5 |
| 67.3 | 65.8 |

Wear resistance test: a Korean Minoan solid eraser (with a diameter of 6 mm, Type A) (Made by MIRAE SCIENCE, Minoan) was used as a wear-resistant head on a 1 $cm^2$ indenter. Under the condition of applying 1 kgf load, the AF film surface formed on the glass substrate was rubbed 2500 (or more) times under a condition of a stroke of 40 mm and a speed of 40 mm/SEC, then dry rubbed and cleaned with a cloth [made by Ozu Industries, DUSPER (registered trademark)] and the surface of AF film was cleaned. Then, the water contact angle (°) was measured at three positions on the surface of AF film having done with wear-resisting test. Each position was measured and repeated three times to measure the average water contact angle (°) at nine positions in total.

TABLE 4-1

Device models for vacuum coating in examples of the present invention

| | |
|---|---|
| Vacuum coating machine model | Hanyi vacuum 2050 electron gun vacuum coating machine |
| Mechanical pump model | Leibao SV630B |
| Roots pump model | Lebauwau2001 |
| Diffusion pump model | HDP-700 (28") |
| PolyCold model | PFC-1102HC |
| Ion source model | Hanyi homemade Ion Beam Source |
| Electron gun model | HEG-103 |
| Film thickness controller | Inficon XTC/3S |

Note: in order to form the required vacuum conditions for coating, the technicians in this field can select some or all of the pumps listed in Table 4-1 above according to conventional means and use them as required. Among them, the mechanical pump is also known as the front stage pump, which uses oil to maintain the sealing effect and relies on mechanical methods to constantly change the volume of the pump suction cavity, so that the volume of the gas in the container is constantly expanding to get vacuum. Roots pump is a booster pump, its role is to increase the pressure difference between the air inlet and exhaust port, which uses the mechanical pump as a former pump. Diffusion pump is used in order to obtain high vacuum, the diffusion pump is used by taking the mechanical pump and roots pump as the front pumps. Polycold is a cryogenic water pump designed to trap residual gases in high vacuum environments where diffusion pumps are used. Its working principle is to put a refrigeration coil which can reach −120° C. below, in the pump mouth of the diffusion pump, through the cryogenic condensation effect on its surface, quickly collect the residual gas of the vacuum system.

TABLE 4-2

Conditions for forming composite coating layers in each example of the present invention

| coating temperature | process | Start vacuum | process Vacuum degree | Film coating rate | Electron gun or steam resistance current | Ion source parameters Gas parameters Ar | $O_2$ | Anode voltage | Anode current | neutralization current |
|---|---|---|---|---|---|---|---|---|---|---|
| 80° C. | Plasma cleaning before coating | 5.0e−6 torr | 5.1e−5 torr | — | — | 28 sccm | 0 | 120 V | 7 A | 15 A |
| | $SiO_2$ | 4.8e−6 torr | 3.0e−5 torr | 2.0 A/S | beam: 131 mA | 15 sccm | 5 sccm | 100 V | 7 A | 15 A |
| | NaF | 4.8e−6 torr | 4.1e−5 torr | 0.5 A/S | beam: 21 mA | 22 sccm | 0 | 150 V | 7 A | 15 A |
| | PFPE | 4.6e−6 torr | 7.5e−6 torr | maximum 7.6 A/S | beam: 86 A | | | | | |

TABLE 5-1 glass ceramic without ion exchange in example 4 (crystallinity of 80.1%) is used as glass substrates to form composite coating layers

| glass substrate No. | design of film system (nm) SiO₂ | NaF | AF | Measuring point for four Angles on the same piece of glass Initial water contact angle (degree) | | | | measuring point for the wear zone at both ends and the middle water contact Angle After 2500 times of rubber wear tests(degree) | | |
|---|---|---|---|---|---|---|---|---|---|---|
| #4-A1 | 25 | 1 | 25 | 117.5 | 117.6 | 116.9 | 116.8 | 69.7 | 61.5 | 61.2 |
| #4-A2 | 25 | 2 | 25 | 116.2 | 115.6 | 116.0 | 115.6 | 89.5 | 81.5 | 86.3 |
| #4-A3 | 22 | 1 | 25 | 116.0 | 115.6 | 117.5 | 115.3 | 72.3 | 72.9 | 72.2 |
| #4-A4 | 10 | 2 | 25 | 117.5 | 115.4 | 115.5 | 114.6 | 117.8 | 115.8 | 116.2 |
| #4-A5 | 8 | 2 | 25 | 117.4 | 115.6 | 115.5 | 115.9 | 116.1 | 116.3 | 115.6 |
| #4-A6 | 5 | 1 | 25 | 115.4 | 114.9 | 113.3 | 115.1 | 116.6 | 114.5 | 114.9 |
| #4-A7 | 10 | 8 | 25 | 97.4 | 90.3 | 103.8 | 98.3 | 52.1 | 61.2 | 62.2 |
| #4-A8 | 8 | 7 | 25 | 92.4 | 92.4 | 92.7 | 90.7 | 46.7 | 56.2 | 45.4 |
| #4-A9 | 5 | 6 | 25 | 109.4 | 104.9 | 103.3 | 105.1 | 68.3 | 97.2 | 57.4 |
| #4-A10 | 10 | 5 | 25 | 111.6 | 109.6 | 109.8 | 108.9 | 101.2 | 105.6 | 106.9 |
| #4-A11 | 8 | 3 | 25 | 113.8 | 112.1 | 114.4 | 112.5 | 110.6 | 112.6 | 113.8 |
| #4-A12 | 5 | 1 | 25 | 114.9 | 114.3 | 112.8 | 114.6 | 113.6 | 110.1 | 112.7 |
| #4-A13 | 15 | 1 | 25 | 116.5 | 116.6 | 115.4 | 115.3 | 113.7 | 105.5 | 105.2 |
| #4-A14 | 15 | 2 | 15 | 115.4 | 114.6 | 115.7 | 114.3 | 113.5 | 105.5 | 110.3 |
| #4-A15 | 12 | 1 | 10 | 113.0 | 112.5 | 113.3 | 112.2 | 104.3 | 104.9 | 104.2 |
| #4-A16 | 10 | 0 | 25 | 105.3 | 97.7 | 89.0 | 101.4 | 40.7 | 60.1 | 54.8 |
| #4-A17 | 8 | 0 | 25 | 95.9 | 60.4 | 90.6 | 91.4 | 40.2 | 41.4 | 40.6 |
| #4-A18 | 5 | 0 | 25 | 78.5 | 83.6 | 88.7 | 92.1 | 43.2 | 41.3 | 54.3 |

TABLE 5-3 glass ceramic with ion exchange in example 4 (crystallinity of 80.1%) is used as glass substrates to form composite coating layers

| glass substrate No. | design of film system (nm) SiO₂ | NaF | AF | Measuring point for four Angles on the same piece of glass Initial water contact angle (degree) | | | | Measuring point for the wear zone at both ends and the middle water contact Angle After 2500 times of rubber wear tests(degree) | | |
|---|---|---|---|---|---|---|---|---|---|---|
| #4-B1 | 25 | 1 | 25 | 116.1 | 115.1 | 115.9 | 115.5 | 72.1 | 72.8 | 72.2 |
| #4-B2 | 25 | 2 | 25 | 115.7 | 115.6 | 115.5 | 115.7 | 89.9 | 81.9 | 86.7 |
| #4-B3 | 22 | 1 | 25 | 115.7 | 115.8 | 115.2 | 115.1 | 61.5 | 61.8 | 70.1 |
| #4-B4 | 10 | 2 | 25 | 115.4 | 111.1 | 115.7 | 114.9 | 114.7 | 114.4 | 116.5 |
| #4-B5 | 8 | 2 | 25 | 116.8 | 115.6 | 115.0 | 116.0 | 116.7 | 116.9 | 116.1 |
| #4-B6 | 5 | 1 | 25 | 115.7 | 113.6 | 113.8 | 112.9 | 116.9 | 116.4 | 115.7 |
| #4-B7 | 10 | 8 | 25 | 105.4 | 101.3 | 105.7 | 108.9 | 57.3 | 97.1 | 68.2 |
| #4-B8 | 8 | 7 | 25 | 92.0 | 92.5 | 92.3 | 90.7 | 46.9 | 56.5 | 45.6 |
| #4-B9 | 5 | 6 | 25 | 95.9 | 88.9 | 102.2 | 96.8 | 62.5 | 61.5 | 52.4 |
| #4-B10 | 10 | 5 | 25 | 114.9 | 110.5 | 115.1 | 114.3 | 112.6 | 110.0 | 113.5 |

TABLE 5-3-continued glass ceramic with ion exchange in example 4 (crystallinity of 80.1%)
is used as glass substrates to form composite coating layers

| glass substrate No. | design of film system (nm) | | | Measuring point for four Angles on the same piece of glass Initial water contact angle (degree) | | | | Measuring point for the wear zone at both ends and the middle water contact Angle After 2500 times of rubber wear tests(degree) | | |
|---|---|---|---|---|---|---|---|---|---|---|
| | $SiO_2$ | NaF | AF | | | | | | | |
| #4-B11 | 8 | 3 | 25 | 113.3 | 112.1 | 113.8 | 112.5 | 111.2 | 113.2 | 114.4 |
| #4-B12 | 5 | 1 | 25 | 109.9 | 107.9 | 108.1 | 107.3 | 107.5 | 106.1 | 101.7 |
| #4-B13 | 15 | 1 | 25 | 113.1 | 111.0 | 112.8 | 112.5 | 104.1 | 104.8 | 104.2 |
| #4-B14 | 15 | 2 | 15 | 114.8 | 114.7 | 115.1 | 114.4 | 114.1 | 106.0 | 110.9 |
| #4-B15 | 12 | 1 | 10 | 114.8 | 114.9 | 113.7 | 113.6 | 105.7 | 106.0 | 114.3 |
| #4-B16 | 10 | 0 | 25 | 92.4 | 88.7 | 84.0 | 78.7 | 60.4 | 40.9 | 54.3 |
| #4-B17 | 8 | 0 | 25 | 99.7 | 72.5 | 100.7 | 92.3 | 41.6 | 40.4 | 40.2 |
| #4-B18 | 5 | 0 | 25 | 101.9 | 87.2 | 96.8 | 109.5 | 41.5 | 43.4 | 53.8 |

2. The glass ceramic without ion exchange and those with ion exchange in example 8 were respectively used as glass substrates to form composite coating layers Similar to the operation in Section 1 above for the glass ceramic formed in example 4 being used as a glass substrate to form a composite coating layer, the difference is that, in this section, the glass ceramic without ion exchange (no. as #8-A1 to 8-A15 respectively) and the glass ceramic with ion exchange (no. as #8-B1 to 8-B15 respectively) in example 8 were used as the glass substrates, to form a composite coating layer comprising the $SiO_2$, NaF and AF film and the composite coating layer only comprising $SiO_2$ and AF film (the glass ceramics without ion exchange were numbered as #8-A16 to 8-A18 respectively; the glass ceramics with ion exchange were numbered as #8-B16 to 8-B18 respectively). The test results of water contact angle on the outer surface of the coating layers were shown in Table 6-1 and Table 6-2.

TABLE 6-1 glass ceramic without ion exchange in example 8 (crystallinity of 90.35%)
is used as glass substrates to form composite coating layers

| glass substrate No. | design of film system (nm) | | | Measuring point for four Angles on the same piece of glass Initial water contact angle (degree) | | | | Measuring point for the wear zone at both ends and the middle water contact angle after 2500 times of rubber wear tests(degree) | | |
|---|---|---|---|---|---|---|---|---|---|---|
| | $SiO_2$ | NaF | AF | | | | | | | |
| #8-A1 | 25 | 1 | 25 | 116.9 | 117.0 | 116.4 | 116.2 | 69.4 | 61.2 | 60.9 |
| #8-A2 | 25 | 2 | 25 | 115.7 | 115.0 | 115.5 | 115.1 | 89.1 | 81.1 | 85.9 |
| #8-A3 | 22 | 1 | 25 | 115.5 | 115.0 | 116.9 | 114.8 | 71.9 | 72.5 | 71.8 |
| #8-A4 | 10 | 2 | 25 | 116.9 | 114.8 | 115.0 | 114.1 | 117.2 | 115.2 | 115.7 |
| #8-A5 | 8 | 2 | 25 | 116.8 | 115.0 | 115.0 | 115.4 | 115.5 | 115.7 | 115.0 |
| #8-A6 | 5 | 1 | 25 | 114.9 | 114.3 | 112.8 | 114.6 | 116.0 | 113.9 | 114.3 |
| #8-A7 | 10 | 8 | 25 | 96.9 | 89.8 | 103.3 | 97.8 | 51.8 | 60.9 | 61.9 |
| #8-A8 | 8 | 7 | 25 | 92.0 | 92.0 | 92.3 | 90.2 | 46.5 | 55.9 | 45.2 |
| #8-A9 | 5 | 6 | 25 | 108.9 | 104.3 | 102.8 | 104.6 | 68.0 | 96.7 | 57.1 |
| #8-A10 | 10 | 5 | 25 | 111.0 | 109.0 | 109.2 | 108.4 | 100.7 | 105.1 | 106.4 |
| #8-A11 | 8 | 3 | 25 | 113.3 | 111.5 | 113.8 | 111.9 | 110.0 | 112.0 | 113.2 |
| #8-A12 | 5 | 1 | 25 | 114.3 | 113.7 | 112.2 | 114.0 | 113.0 | 109.5 | 112.1 |
| #8-A13 | 15 | 1 | 25 | 115.9 | 116.0 | 114.8 | 114.7 | 113.1 | 105.0 | 104.7 |
| #8-A14 | 15 | 2 | 15 | 114.8 | 114.0 | 115.1 | 113.7 | 112.9 | 105.0 | 109.7 |
| #8-A15 | 12 | 1 | 10 | 112.5 | 111.9 | 112.7 | 111.6 | 103.8 | 104.4 | 103.7 |
| #8-A16 | 10 | 0 | 25 | 89.4 | 98.2 | 105.8 | 101.9 | 60.4 | 40.9 | 55.1 |
| #8-A17 | 8 | 0 | 25 | 108.6 | 60.7 | 96.4 | 91.9 | 41.6 | 40.4 | 40.8 |
| #8-A18 | 5 | 0 | 25 | 89.1 | 84.0 | 78.9 | 92.6 | 41.5 | 43.4 | 54.6 |

TABLE 6-2 glass ceramic with ion exchange in example 4 (crystallinity of 90.35%)
is used as glass substrates to form composite coating layers

| glass substrate No. | design of film system (nm) | | | Measuring point for four Angles on the same piece of glass Initial water contact angle (degree) | | | | Measuring point for the wear zone at both ends and the middle water contact Angle After 2500 times of rubber wear tests(degree) | | |
|---|---|---|---|---|---|---|---|---|---|---|
| | $SiO_2$ | NaF | AF | | | | | | | |
| #8-B1 | 25 | 1 | 25 | 115.6 | 114.5 | 115.3 | 114.9 | 71.8 | 72.5 | 71.9 |
| #8-B2 | 25 | 2 | 25 | 115.1 | 115.0 | 114.9 | 115.1 | 89.5 | 81.5 | 86.3 |
| #8-B3 | 22 | 1 | 25 | 115.1 | 115.2 | 114.6 | 114.5 | 61.2 | 61.5 | 69.7 |

TABLE 6-2-continued glass ceramic with ion exchange in example 4 (crystallinity of 90.35%)
is used as glass substrates to form composite coating layers

| glass substrate No. | design of film system (nm) | | | Measuring point for four Angles on the same piece of glass Initial water contact angle (degree) | | | | Measuring point for the wear zone at both ends and the middle water contact Angle After 2500 times of rubber wear tests(degree) | | |
|---|---|---|---|---|---|---|---|---|---|---|
| | $SiO_2$ | NaF | AF | | | | | | | |
| #8-B4 | 10 | 2 | 25 | 114.9 | 110.5 | 115.1 | 114.3 | 114.2 | 113.8 | 115.9 |
| #8-B5 | 8 | 2 | 25 | 116.2 | 115.0 | 114.4 | 115.4 | 116.1 | 116.3 | 115.6 |
| #8-B6 | 5 | 1 | 25 | 115.1 | 113.1 | 113.2 | 112.3 | 116.3 | 115.8 | 115.1 |
| #8-B7 | 10 | 8 | 25 | 104.9 | 100.8 | 105.1 | 108.4 | 57.1 | 96.6 | 67.9 |
| #8-B8 | 8 | 7 | 25 | 91.5 | 92.0 | 91.8 | 90.3 | 46.7 | 56.2 | 45.4 |
| #8-B9 | 5 | 6 | 25 | 95.5 | 88.5 | 101.7 | 96.3 | 62.2 | 61.2 | 52.1 |
| #8-B10 | 10 | 5 | 25 | 114.3 | 110.0 | 114.6 | 113.7 | 112.0 | 109.4 | 112.9 |
| #8-B11 | 8 | 3 | 25 | 112.7 | 111.6 | 113.2 | 111.9 | 110.6 | 112.6 | 113.8 |
| #8-B12 | 5 | 1 | 25 | 109.4 | 107.4 | 107.6 | 106.7 | 106.9 | 105.6 | 101.2 |
| #8-B13 | 15 | 1 | 25 | 112.5 | 110.5 | 112.2 | 111.9 | 103.6 | 104.3 | 103.7 |
| #8-B14 | 15 | 2 | 15 | 114.2 | 114.1 | 114.5 | 113.8 | 113.5 | 105.5 | 110.3 |
| #8-B15 | 12 | 1 | 10 | 114.2 | 114.3 | 113.1 | 113.0 | 105.2 | 105.5 | 113.7 |
| #8-B16 | 10 | 0 | 25 | 92.8 | 89.1 | 84.4 | 79.1 | 60.7 | 41.1 | 54.5 |
| #8-B17 | 8 | 0 | 25 | 100.2 | 72.8 | 101.2 | 92.8 | 41.8 | 40.6 | 40.4 |
| #8-B18 | 5 | 0 | 25 | 102.4 | 87.7 | 97.3 | 110.1 | 41.7 | 43.6 | 54.0 |

3. The glass ceramic without ion exchange and those with ion exchange in example 12 were respectively used as glass substrates to form composite coating layers Similar to the operation in Section 1 above for the glass ceramic formed in example 4 being used as a glass substrate to form a composite coating layer, the difference is that, in this section, the glass ceramic without ion exchange (no. as #12-A1 to 12-A15 respectively) and the glass ceramic with ion exchange (no. as #12-B1 to 12-B15 respectively) in example 12 were used as the glass substrates, to form a composite coating layer comprising the $SiO_2$, NaF and AF film and the composite coating layer only comprising $SiO_2$ and AF film (the glass ceramics without ion exchange were numbered as #12-A16 to 12-A18 respectively; the glass ceramics with ion exchange were numbered as #12-B16 to 12-B18 respectively). The test results of water contact angle on the outer surface of the coating layers were shown in Table 7-1 and Table 7-2.

TABLE 7-1 glass ceramic without ion exchange in example 12 (crystallinity of 71.60%)
was used as glass substrates to form composite coating layers

| glass substrate No. | design of film system (nm) | | | Measuring point for four Angles on the same piece of glass Initial water contact angle (degree) | | | | Measuring point for the wear zone at both ends and the middle water contact Angle After 2500 times of rubber wear tests(degree) | | |
|---|---|---|---|---|---|---|---|---|---|---|
| | $SiO_2$ | NaF | AF | | | | | | | |
| #12-A1 | 25 | 1 | 25 | 116.3 | 116.4 | 115.8 | 115.7 | 69.0 | 60.9 | 60.6 |
| #12-A2 | 25 | 2 | 25 | 115.1 | 114.4 | 114.9 | 114.5 | 88.6 | 80.7 | 85.4 |
| #12-A3 | 22 | 1 | 25 | 114.9 | 114.4 | 116.3 | 114.2 | 71.6 | 72.2 | 71.5 |
| #12-A4 | 10 | 2 | 25 | 116.3 | 114.2 | 114.4 | 113.5 | 116.6 | 114.6 | 115.1 |
| #12-A5 | 8 | 2 | 25 | 116.2 | 114.4 | 114.4 | 114.8 | 114.9 | 115.1 | 114.4 |
| #12-A6 | 5 | 1 | 25 | 114.3 | 113.7 | 112.2 | 114.0 | 115.4 | 113.4 | 113.7 |
| #12-A7 | 10 | 8 | 25 | 96.4 | 89.4 | 102.8 | 97.3 | 51.6 | 60.6 | 61.6 |
| #12-A8 | 8 | 7 | 25 | 91.5 | 91.5 | 91.8 | 89.8 | 46.2 | 55.6 | 44.9 |
| #12-A9 | 5 | 6 | 25 | 108.4 | 103.8 | 102.3 | 104.1 | 67.6 | 96.2 | 56.8 |
| #12-A10 | 10 | 5 | 25 | 110.5 | 108.5 | 108.7 | 107.8 | 100.2 | 104.5 | 105.8 |
| #12-A11 | 8 | 3 | 25 | 112.7 | 111.0 | 113.2 | 111.3 | 109.5 | 111.5 | 112.7 |
| #12-A12 | 5 | 1 | 25 | 113.7 | 113.1 | 111.6 | 113.4 | 112.5 | 109.0 | 111.6 |
| #12-A13 | 15 | 1 | 25 | 115.3 | 115.4 | 114.2 | 114.1 | 112.6 | 104.4 | 104.2 |
| #12-A14 | 15 | 2 | 15 | 114.2 | 113.5 | 114.5 | 113.2 | 112.4 | 104.4 | 109.2 |
| #12-A15 | 12 | 1 | 10 | 111.9 | 111.4 | 112.2 | 111.1 | 103.3 | 103.9 | 103.2 |
| #12-A16 | 10 | 0 | 25 | 89.0 | 97.7 | 105.3 | 101.4 | 60.1 | 40.7 | 54.8 |
| #12-A17 | 8 | 0 | 25 | 90.6 | 60.4 | 95.9 | 91.4 | 89.4 | 40.2 | 40.6 |
| #12-A18 | 5 | 0 | 25 | 88.7 | 83.6 | 78.5 | 92.1 | 41.3 | 43.2 | 54.3 |

TABLE 7-2 glass ceramic with ion exchange in example 12 (crystallinity of 71.60%)
was used as glass substrates to form composite coating layers

| glass substrate No. | design of film system (nm) | | | Measuring point for four Angles on the same piece of glass Initial water contact angle (degree) | | | | Measuring point for the wear zone at both ends and the middle water contact Angle After 2500 times of rubber wear tests(degree) | | |
|---|---|---|---|---|---|---|---|---|---|---|
| | SiO$_2$ | NaF | AF | | | | | | | |
| #12-B1 | 25 | 1 | 25 | 115.0 | 114.0 | 114.8 | 114.3 | 71.4 | 72.1 | 71.5 |
| #12-B2 | 25 | 2 | 25 | 114.5 | 114.5 | 114.3 | 114.5 | 89.1 | 81.1 | 85.9 |
| #12-B3 | 22 | 1 | 25 | 114.5 | 114.6 | 114.0 | 113.9 | 60.9 | 61.2 | 69.4 |
| #12-B4 | 10 | 2 | 25 | 114.3 | 110.0 | 114.6 | 113.7 | 113.6 | 113.3 | 115.3 |
| #12-B5 | 8 | 2 | 25 | 115.6 | 114.5 | 113.8 | 114.8 | 115.5 | 115.7 | 115.0 |
| #12-B6 | 5 | 1 | 25 | 114.5 | 112.5 | 112.7 | 111.8 | 115.7 | 115.2 | 114.5 |
| #12-B7 | 10 | 8 | 25 | 104.3 | 100.3 | 104.6 | 107.8 | 56.8 | 96.1 | 67.6 |
| #12-B8 | 8 | 7 | 25 | 91.1 | 91.6 | 91.4 | 89.8 | 46.5 | 55.9 | 45.2 |
| #12-B9 | 5 | 6 | 25 | 95.0 | 88.1 | 101.2 | 95.9 | 61.9 | 60.9 | 51.8 |
| #12-B10 | 10 | 5 | 25 | 113.7 | 109.4 | 114.0 | 113.2 | 111.5 | 108.9 | 112.4 |
| #12-B11 | 8 | 3 | 25 | 112.1 | 111.0 | 112.7 | 111.4 | 110.0 | 112.0 | 113.2 |
| #12-B12 | 5 | 1 | 25 | 108.8 | 106.9 | 107.0 | 106.2 | 106.4 | 105.1 | 100.7 |
| #12-B13 | 15 | 1 | 25 | 111.9 | 109.9 | 111.6 | 111.4 | 103.1 | 103.7 | 103.2 |
| #12-B14 | 15 | 2 | 15 | 113.7 | 113.5 | 114.0 | 113.2 | 112.9 | 105.0 | 109.7 |
| #12-B15 | 12 | 1 | 10 | 113.6 | 113.7 | 112.5 | 112.4 | 104.7 | 105.0 | 113.2 |
| #12-B16 | 10 | 0 | 25 | 92.4 | 88.7 | 84.0 | 78.7 | 60.4 | 40.9 | 54.3 |
| #12-B17 | 8 | 0 | 25 | 99.7 | 72.5 | 100.7 | 92.3 | 41.6 | 40.4 | 40.2 |
| #12-B18 | 5 | 0 | 25 | 101.9 | 87.2 | 96.8 | 109.5 | 41.5 | 43.4 | 53.8 |

4. The glass ceramic without ion exchange and those with ion exchange in example 13 were respectively used as glass substrates to form composite coating layers Similar to the operation in Section 1 above for the glass ceramic formed in example 4 being used as a glass substrate to form a composite coating layer, the difference is that, in this section, the glass ceramic without ion exchange (no. as #13-A1 to 13-A15 respectively) and the glass ceramic with ion exchange (no. as #13-B1 to 13-B15 respectively) in example 13 were used as the glass substrates, to form a composite coating layer comprising the SiO$_2$, NaF and AF film and the composite coating layer only comprising SiO$_2$ and AF film (the glass ceramics without ion exchange were numbered as #13-A16 to 13-A18 respectively; the glass ceramics with ion exchange were numbered as #13-B16 to 13-B18 respectively). The test results of water contact angle on the outer surface of the coating layers were shown in Table 8-1 and Table 8-2.

TABLE 8-1 glass ceramic without ion exchange in example 13 (crystallinity of 61.2%)
was used as glass substrates to form composite coating layers

| glass substrate No. | design of film system (nm) | | | Measuring point for four Angles on the same piece of glass Initial water contact angle (degree) | | | | Measuring point for the wear zone at both ends and the middle water contact Angle After 2500 times of rubber wear tests(degree) | | |
|---|---|---|---|---|---|---|---|---|---|---|
| | SiO$_2$ | NaF | AF | | | | | | | |
| #13-A1 | 25 | 1 | 25 | 116.6 | 116.7 | 116.1 | 116.0 | 69.2 | 61.1 | 60.8 |
| #13-A2 | 25 | 2 | 25 | 115.4 | 114.8 | 115.2 | 114.8 | 88.9 | 80.9 | 85.7 |
| #13-A3 | 22 | 1 | 25 | 115.2 | 114.8 | 116.6 | 114.5 | 71.8 | 72.4 | 71.7 |
| #13-A4 | 10 | 2 | 25 | 116.6 | 114.6 | 114.7 | 113.8 | 117.0 | 115.0 | 115.4 |
| #13-A5 | 8 | 2 | 25 | 116.5 | 114.8 | 114.7 | 115.1 | 115.3 | 115.5 | 114.7 |
| #13-A6 | 5 | 1 | 25 | 114.6 | 114.1 | 112.5 | 114.3 | 115.8 | 113.7 | 114.1 |
| #13-A7 | 10 | 8 | 25 | 96.7 | 89.7 | 103.1 | 97.6 | 51.7 | 60.8 | 61.8 |
| #13-A8 | 8 | 7 | 25 | 91.8 | 91.8 | 92.1 | 90.1 | 46.4 | 55.8 | 45.1 |
| #13-A9 | 5 | 6 | 25 | 108.7 | 104.1 | 102.6 | 104.4 | 67.8 | 96.5 | 57.0 |
| #13-A10 | 10 | 5 | 25 | 110.8 | 108.8 | 109.0 | 108.1 | 100.5 | 104.9 | 106.2 |
| #13-A11 | 8 | 3 | 25 | 113.0 | 111.3 | 113.6 | 111.7 | 109.8 | 111.8 | 113.0 |
| #13-A12 | 5 | 1 | 25 | 114.1 | 113.5 | 112.0 | 113.8 | 112.8 | 109.3 | 111.9 |
| #13-A13 | 15 | 1 | 25 | 115.7 | 115.8 | 114.6 | 114.5 | 112.9 | 104.8 | 104.5 |
| #13-A14 | 15 | 2 | 15 | 114.6 | 113.8 | 114.9 | 113.5 | 112.7 | 104.8 | 109.5 |
| #13-A15 | 12 | 1 | 10 | 112.3 | 111.7 | 112.5 | 111.4 | 103.6 | 104.2 | 103.5 |
| #13-A16 | 10 | 0 | 25 | 109.3 | 98.0 | 105.6 | 101.7 | 60.3 | 40.8 | 55.0 |
| #13-A17 | 8 | 0 | 25 | 90.9 | 105.6 | 96.2 | 91.7 | 41.5 | 70.3 | 60.7 |
| #13-A18 | 5 | 0 | 25 | 89.0 | 83.8 | 108.7 | 102.4 | 81.4 | 43.3 | 54.5 |

TABLE 8-2 glass ceramic with ion exchange in example 13 (crystallinity of 61.2%)
was used as glass substrates to form composite coating layers

| glass substrate No. | design of film system (nm) | | | Measuring point for four Angles on the same piece of glass Initial water contact angle (degree) | | | | Measuring point for the wear zone a both ends and the middle water contact Angle After 2500 times of rubber wear tests(degree) | | |
|---|---|---|---|---|---|---|---|---|---|---|
| | $SiO_2$ | NaF | AF | | | | | | | |
| #13-B1 | 25 | 1 | 25 | 115.3 | 114.3 | 115.1 | 114.7 | 71.6 | 72.3 | 71.7 |
| #13-B2 | 25 | 2 | 25 | 114.9 | 114.8 | 114.7 | 114.9 | 89.3 | 81.3 | 86.1 |
| #13-B3 | 22 | 1 | 25 | 114.9 | 115.0 | 114.4 | 114.3 | 61.1 | 61.4 | 69.6 |
| #13-B4 | 10 | 2 | 25 | 114.6 | 110.3 | 114.9 | 114.1 | 113.9 | 113.6 | 115.7 |
| #13-B5 | 8 | 2 | 25 | 115.9 | 114.8 | 114.2 | 115.2 | 115.9 | 116.0 | 115.3 |
| #13-B6 | 5 | 1 | 25 | 114.9 | 112.8 | 113.0 | 112.1 | 116.0 | 115.6 | 114.9 |
| #13-B7 | 10 | 8 | 25 | 104.6 | 100.6 | 104.9 | 108.1 | 56.9 | 96.4 | 67.8 |
| #13-B8 | 8 | 7 | 25 | 91.3 | 91.8 | 91.6 | 90.1 | 46.6 | 56.1 | 45.3 |
| #13-B9 | 5 | 6 | 25 | 95.3 | 88.3 | 101.5 | 96.1 | 62.1 | 61.1 | 52.0 |
| #13-B10 | 10 | 5 | 25 | 114.1 | 109.7 | 114.3 | 113.5 | 111.8 | 109.2 | 112.7 |
| #13-B11 | 8 | 3 | 25 | 112.5 | 111.4 | 113.0 | 111.7 | 110.4 | 112.4 | 113.6 |
| #13-B12 | 5 | 1 | 25 | 109.1 | 107.2 | 107.4 | 106.5 | 106.7 | 105.4 | 101.0 |
| #13-B13 | 15 | 1 | 25 | 112.3 | 110.3 | 112.0 | 111.7 | 103.4 | 104.1 | 103.5 |
| #13-B14 | 15 | 2 | 15 | 114.0 | 113.9 | 114.3 | 113.6 | 113.3 | 105.3 | 110.1 |
| #13-B15 | 12 | 1 | 10 | 113.9 | 114.0 | 112.9 | 112.8 | 105.0 | 105.3 | 113.5 |
| #13-B16 | 10 | 0 | 25 | 92.7 | 89.0 | 84.3 | 79.0 | 60.6 | 41.0 | 54.4 |
| #13-B17 | 8 | 0 | 25 | 100.0 | 72.7 | 101.0 | 92.6 | 41.7 | 40.5 | 40.3 |
| #13-B18 | 5 | 0 | 25 | 102.2 | 87.5 | 97.1 | 109.8 | 41.6 | 43.5 | 53.9 |

As can be seen from the experimental results in above Table 5-1, Table 5-2, Table 6-1, Table 6-2, Table 7-1, Table 7-2, Table 8-1 and Table 8-2, four glass ceramic with different crystal ratios were selected from the 13 glass ceramic formulations, respectively, without ion exchange and with ion exchange were used as the glass substrate to form three layers of coating. The following conclusions can be drawn from these data:

1) when the bottom layer thickness is too thick and exceeds 20 nm, the wear resistance of AF is not good, so the thickness is better not to exceed 15 nm;

2) when the intermediate layer is too thick and exceeds 5 nm, the initial performance and wear resistance of AF are poor. However, if there is no intermediate layer, it can be seen from the contact angle data of the last three rows in each table that the initial contact angle is less than 100 degrees for most of them, and the maximum contact angle is up to about 60 degrees after 2500 times of friction.

3) if the thickness of bottom layer is moderate, and the intermediate layer is thin, any thickness of AF layer from thick to thin can achieve the effect;

4) if the surface layer is not less than 10 nm, the water-repellent and oil-repellent property of the composite coating layer is acceptable, which has excellent wear resistance. preferably the surface layer is not less than 15 nm, the thicker the surface layer, the better the wear resistance, from the cost point of view, when the surface layer is not more than 25 nm, the water-repellent and oil-repellent property and wear resistance thereof are ideal.

5) even without ion exchange, that is, prestressing treatment, three layers of composite coating layers are directly formed on glass ceramic, water-repellent and oil-repellent property thereof is also excellent; while the reinforced glass having been ion exchanged is further used to form the three layers of composite coating, the wear resistant test shows that the contact angle is larger, that is to say, the water-repellent and oil-repellent property is better.

Overall, it can be seen that the preferred thickness of the bottom layer is 3-15 nm, the preferred thickness of the intermediate layer is 1-5 nm, and the preferred thickness of AF film layer is not less than 10 nm, not less than 15 nm, which can be 10-25 nm. In addition, the preferred intermediate layer is 1-2 nm. Moreover, the bottom layer of 5-10 nm can achieve a good effect, while 5-8 nm is the best.

5. The glass ceramic in example 4 that have not undergone ion exchange in example 4 of the first part (on the basis of the 4# formula, the glass ceramic was prepared according to the steps (1) and (2) described, without the ion exchange treatment of step (3)) were used to form a surface composite coating layer (numbered as #4-a1, #4-a2, #4-a3, respectively) in accordance with the above mentioned operating methods and conditions in section 1, the difference is only that the coating thickness is different, as shown in table 9. The surface coating quality and durability of the composite coating were tested, and the results are also summarized in Table 9 below.

The glass ceramic in example 4 that have undergone ion exchange in example 4 of the first part were used to form a surface composite coating layer in accordance with the above mentioned operating methods and conditions in section 1 (also referred as reinforced glass, which was numbered as #4-b1, #4-b2, #4-b3, respectively), the difference is only that the coating thickness is different, as shown in table 9. The coating quality and durability of the composite coating formed on its surface were tested, and the surface pressure stress and pressure stress depth were tested according to the test method of example 4 in the first part. All test results were also summarized in Table 9 below.

The glass ceramic in example 4 that have not undergone ion exchange was added with black colorant, that is, on the basis of formula 4#, the total mol of each substance in the original mother glass formula was taken as the base, glass ceramics were prepared by adding 0.5 mol % NiO, 1 mol % $Fe_2O_3$ and 0.3 mol % CoO in accordance with steps (1) and (2) in the first part "glass preparation example". The composite coating on the surface (also known as black glass without ion exchange or black glass without prestressed treatment, numbered as #4-C1, #4-C2, #4-C3) was carried out according to the operation method and operating conditions described in the first part above respectively. The difference is only that the coating thickness is different, as shown in table 9. The surface coating quality and durability of the composite coating were tested, and the results were also summarized in Table 9 below. The appearance of the black glass was opaque black, and shows dark blue black under the strong white light.

TABLE 9 coating layer properties of composite coatings without ion exchange, with ion exchange and added with black colorant

| glass No. | Glass substrate process | Surface pressure stress (Mpa) | pressure stress depth (μm) | design of film system (nm) | | | Measuring point for four Angles on the same piece of glass Initial water contact angle (degree) | | | | Measuring point for the wear zone at both ends and the middle water contact Angle After 2500 times of rubber wear tests(degree) | | |
|---|---|---|---|---|---|---|---|---|---|---|---|---|---|
| | | | | SiO₂ | NaF | AF | | | | | | | |
| #4-a1 | without | — | — | 5 | 1 | 25 | 115.2 | 114.6 | 113.1 | 114.9 | 116.4 | 114.3 | 114.6 |
| #4-a2 | ion | — | — | 5 | 2 | 25 | 117.1 | 115.3 | 115.3 | 115.7 | 115.9 | 116.0 | 115.3 |
| #4-a3 | exchange (without black colorant) | — | — | 5 | 3 | 25 | 117.2 | 115.1 | 115.3 | 114.4 | 117.6 | 115.6 | 116.0 |
| #4-b1 | ion | 390 | 48 | 5 | 1 | 25 | 117.0 | 114.9 | 115.1 | 114.2 | 113.3 | 105.3 | 110.1 |
| #4-b2 | exchanged | 390 | 48 | 5 | 2 | 25 | 116.9 | 115.1 | 115.1 | 115.5 | 113.5 | 105.3 | 105.0 |
| #4-b3 | (without black colorant) | 390 | 48 | 5 | 3 | 25 | 115.0 | 114.4 | 112.9 | 114.7 | 113.4 | 109.9 | 112.5 |
| #4-c1 | without | — | — | 5 | 1 | 25 | 114.6 | 114.1 | 112.5 | 114.3 | 114.0 | 112.0 | 112.3 |
| #4-c2 | ion | — | — | 5 | 2 | 25 | 116.5 | 114.8 | 115.7 | 116.0 | 115.8 | 113.7 | 115.2 |
| #4-c3 | exchange (added with black colorant) | — | — | 5 | 3 | 25 | 116.6 | 114.6 | 115.7 | 114.7 | 115.2 | 113.2 | 113.7 |

As can be seen from Table 9 above, the thin intermediate layer is within the range of 1-3 nm, and the AF film binding force and wear resistance of the outer surface of the composite coating are excellent regardless of whether it is treated by ion exchange or glass prestressing, and the AF film binding force and wear resistance of the composite coating are not affected even by the addition of black colorant.

The invention claimed is:

1. A microcrystalline glass, comprising a water-repellent and oil-repellent composite coating layer on its surface, characterized in that from the outermost surface of the microcrystalline glass, the composite coating layer comprises: a water-repellent and oil-repellent layer, an intermediate layer and a bottom layer, wherein, the intermediate layer comprises ionic crystals with a lattice energy of 700-3000 KJ/mol, and the bottom layer comprises a compound containing Si—O bonds or a mixed silicon oxide layer; wherein the thickness of the intermediate layer is 1-5 nm, the thickness of the bottom layer is 3-15 nm, and the thickness of the water-repellent oil-repellent layer is not less than 10 nm.

2. The microcrystalline glass according to claim 1, characterized in that crystallinity of the microcrystalline glass is greater than 60 (diffraction integral intensity) %.

3. The microcrystalline glass according to claim 1, characterized in that the intermediate layer is an intermediate layer formed by the ionic crystal with a lattice energy of 725-3000KJ/mol, as an original coating material.

4. The microcrystalline glass according to claim 1, characterized in that the intermediate layer contains fluorinated alkali metals or fluorinated alkaline earth metals compounds.

5. The microcrystalline glass according to claim 1, characterized in that the intermediate layer is an ionic crystal intermediate layer with a lattice energy less than 1050 KJ/mol.

6. The microcrystalline glass according to claim 5, characterized in that the intermediate layer is a crystal formed by at least one ionic crystal of LiF, NaF and/or KF as an original coating material; or an intermediate layer formed by at least one of $MgF_2$, $CaF_2$, $SrF_2$ or $BaF_2$ as an original coating material.

7. The microcrystalline glass according to claim 1, characterized in that when the bottom layer is a multilayer bottom layer, the compound containing Si—O bond or the mixed silicon oxide layer is as the outermost bottom layer, the mixed silicon oxide is a mixture of silicon oxide $SiO_x$, and oxides of at least one other element other than silicon, wherein x is less than or equal to 2; the mixed silicon oxide is a mixture of silicon oxide $SiO_x$, and magnesium fluoride, wherein x is less than or equal to 2; or the mixed silicon oxide is a mixture of silicon oxide $SiO_x$, and oxides of at least one other element other than silicon and magnesium fluoride, wherein x is less than or equal to 2;

the other element is element(s) of aluminum, tin, magnesium, phosphorus, cerium, zirconium, titanium, cesium, barium, strontium, niobium, zinc or boron.

8. The microcrystalline glass according to claim 7, characterized in that the compound containing Si—O bond is $SiO_x$, wherein x is less than or equal to 2; or any one of SiOC, SiON, SiOCN and/or $Si_3N_4$, or a compound with hydrogen bond bonded to any of $SiO_x$, SiOC, SiON and/or SiOCN in any proportion, wherein x is less than or equal to 2.

9. The microcrystalline glass according to claim 1, characterized in that the water-repellent oil-repellent layer is a fluorine-based polymer layer.

10. The microcrystalline glass according to claim 1, characterized in that the microcrystalline glass contains oxides in the following mol %:

$SiO_2$: 40-75%;
$Al_2O_3$: 2-20%;
$B_2O_3$: 0-20%;
$P_2O_5$: 0-10%;
$ZrO_2+TiO_2$: 0-15%;
MgO: 0-5%;
ZnO: 0-4%;
rare earth oxide: 0-5%;
$Na_2O$: 0-5.5%;
$K_2O$: 0-4%;
$Li_2O$: 2-34%; and
$Na_2O+K_2O+Li_2O$: 4-40%;
the rare earth oxide is one or two or more selected from the group consisting of $CeO_2$, $Y_2O_3$, $La_2O_3$, $Ta_2O_3$, $Tm_2O_5$ and $Nd_2O_5$.

11. The microcrystalline glass according to claim 1, characterized in that the microcrystalline glass comprises oxides in the following mol %:
$SiO_2$: 40-72%;
$Al_2O_3$: 4-15%;
$B_2O_3$: 0.4-1.6%;
$P_2O_5$: 0.8-1.5%;
$ZrO_2+TiO_2$: 0.9-4%;
MgO: 0.1-2%;
ZnO: 0.9-3.0%;
rare earth oxide: 0.01-1%;
$Na_2O$: 0-5.5%;
$K_2O$: 0-4%;
$Li_2O$: 10-34%; and
$Na_2O+K_2O+Li_2O$: 15-40%;
the rare earth oxide is one or two or more selected from the group consisting of $CeO_2$, $Y_2O_3$, $La_2O_3$, $Ta_2O_3$, $Tm_2O_5$ and $Nd_2O_5$.

12. The microcrystalline glass according to claim 1, characterized in that the microcrystalline glass further comprises coloring additives and/or clarifying agent.

13. The microcrystalline glass according to claim 12, characterized in that the coloring additive is one or more selected from $Nd_2O_3$, $Fe_2O_3$, CoO, NiO, $V_2O_5$, $MnO_2$, $TiO_2$, CuO and $Cr_2O_3$; the clarifying agent is one or more selected from $As_2O_3$, $Sb_2O_3$, $SnO_2$, chloride, fluoride, compounds containing $SO_3^-$, and the compounds containing $NO_3^-$.

14. The microcrystalline glass according to claim 1, characterized in that, the molar content of coloring additives shall not exceed 5% relative to the overall composition of the glass.

15. The microcrystalline glass according to claim 7, the mixed silicon oxide is a mixture of silicon oxide $SiO_x$ and aluminum oxide.

16. The microcrystalline glass according to claim 9, characterized in that the water-repellent oil-repellent layer is a fluorine-containing polyether silicon oxide layer with a molecular weight not less than 2000.

17. The microcrystalline glass according to claim 1, characterized in that the primary crystal phase of the microcrystalline glass is one or two or more selected from the group consisting of beta quartz solid solution, beta spodumene solid solution, beta lithium nepheline, spinel, rutile, mullite, olivine, enstatite, cordierite, petalite, lithium silicate, lithium disilicate, silica, zirconia, and magnetite.

18. The microcrystalline glass according to claim 1, characterized in that the microcrystalline glass is a glass ceramic with a crystallinity degree of less than 60 (diffraction integral intensity) %.

* * * * *